US006895787B2

(12) United States Patent
Maeiwa

(10) Patent No.: US 6,895,787 B2
(45) Date of Patent: May 24, 2005

(54) KNIT DESIGN METHOD AND APPARATUS

(75) Inventor: Tetsuji Maeiwa, Wakayama (JP)

(73) Assignee: Shima Seiki Manufacturing Limited, Wakayama (JP)

(*) Notice: Subject to any disclaimer, the term of this patent is extended or adjusted under 35 U.S.C. 154(b) by 0 days.

(21) Appl. No.: 10/491,537

(22) PCT Filed: Oct. 4, 2002

(86) PCT No.: PCT/JP02/10356

§ 371 (c)(1),
(2), (4) Date: Oct. 8, 2004

(87) PCT Pub. No.: WO03/032204

PCT Pub. Date: Apr. 17, 2003

(65) Prior Publication Data

US 2005/0039494 A1 Feb. 24, 2005

(30) Foreign Application Priority Data

Oct. 5, 2001 (JP) .......................................... 2001-310558

(51) Int. Cl.[7] .............................................. D04B 15/00
(52) U.S. Cl. ....................................................... 66/232
(58) Field of Search ................... 66/232, 237; 700/130, 700/131, 132, 135, 141

(56) References Cited

U.S. PATENT DOCUMENTS

| | | | |
|---|---|---|---|
| 4,608,642 A | | 8/1986 | Shima |
| 4,856,104 A | * | 8/1989 | Stoll et al. ................... 700/141 |
| 5,388,050 A | * | 2/1995 | Inoue et al. ................. 700/131 |
| 5,557,527 A | * | 9/1996 | Kotaki et al. ............... 700/131 |
| 5,719,777 A | * | 2/1998 | Kotaki ........................ 700/131 |
| 5,812,110 A | * | 9/1998 | Kawasaki et al. .......... 700/141 |
| 6,611,730 B1 | * | 8/2003 | Stoll et al. .................. 700/131 |
| 6,698,253 B2 | * | 3/2004 | Stoll et al. ..................... 66/232 |

FOREIGN PATENT DOCUMENTS

| | | |
|---|---|---|
| EP | 0640707 | 3/1995 |
| EP | 0640707 A1 | 3/1995 |

(Continued)

OTHER PUBLICATIONS

Yuichiro Itoh et al., "A Technique for Representing String States of Knitting and Generating Completed Knitting Images", Thesis Report of Information Processing Society of Japan, vol. 39, No. 1, pp. 60–69, Jan. 1998.

(Continued)

*Primary Examiner*—Danny Worrell
(74) *Attorney, Agent, or Firm*—Wenderoth, Lind & Ponack, L.L.P.

(57) ABSTRACT

An object of the invention is to quickly display a simulation image of knitting stitches approximate to an actually knitted fabric. When an image is present in the position of the knitting stitches 12, 13 corresponding between an upper layer 1 and a lower layer 2, the images of knitting stitches for pattern 11 or transformed knitting stitches 12, 13 in the upper layer 1 having the highest priority are displayed. In each layer, it is possible to perform an editing operation of selecting combinations of knitting stitches previously registered in a form of module from a library and changing the position and the shape of the image of the knitting stitches. The knitting stitches in the periphery of the knitting stitch for a pattern 11 are substituted for the transformed knitting stitches 12, 13 reflecting the influence of the making of the knitting stitch for pattern. Image data on basic knitting stitches 10, the knitting stitch for a pattern 11, and transformed knitting stitches 12, 13 is created utilizing the images of actual knitted fabrics or computer graphics and is stored. By combining the stored image data, a simulation image of knitting stitches like that of an actually knitted fabric can be quickly displayed.

20 Claims, 33 Drawing Sheets

FOREIGN PATENT DOCUMENTS

| | | |
|---|---|---|
| EP | 0768416 | 4/1997 |
| EP | 0768416 A2 | 4/1997 |
| JP | 60-71748 | 4/1985 |
| JP | 7-70890 | 3/1995 |
| JP | 9-111617 | 4/1997 |

OTHER PUBLICATIONS

Yuichiro Itoh et al., "Processing for Knitting Patterns Using a Representation Method for 3D String Diagrams", Thesis Report of Information Processing Society of Japan, vol. 37, No. 2, pp. 249–257, Feb. 1996.

Yuichiro Ito, Masayuki Yamada, Hirohisa Seki, Hidenori Ito, "Amimono ni okeru Himo Jotai Hyogen to Amiagari Moyo Seisei no Ichi Shuho", Transactions of Information Processing Society of Japan, Jan. 15, 1998, vol. 39, N 1, pp. 60–69.

Yuichiro Ito, Masayuki Yamada, Tsuyoshi Miyazaki, Hirohisa Seki, Hidenori Ito, "3 Jigen Himo Zukei Hyogen Hoho o Mochiita Amimono Pattern Shori ni Tsuite", Transactions of Information Processing Society of Japan, Feb. 15, 1996, vol. 37, No. 2, pp. 249–257.

* cited by examiner

FIG. 1
(a)
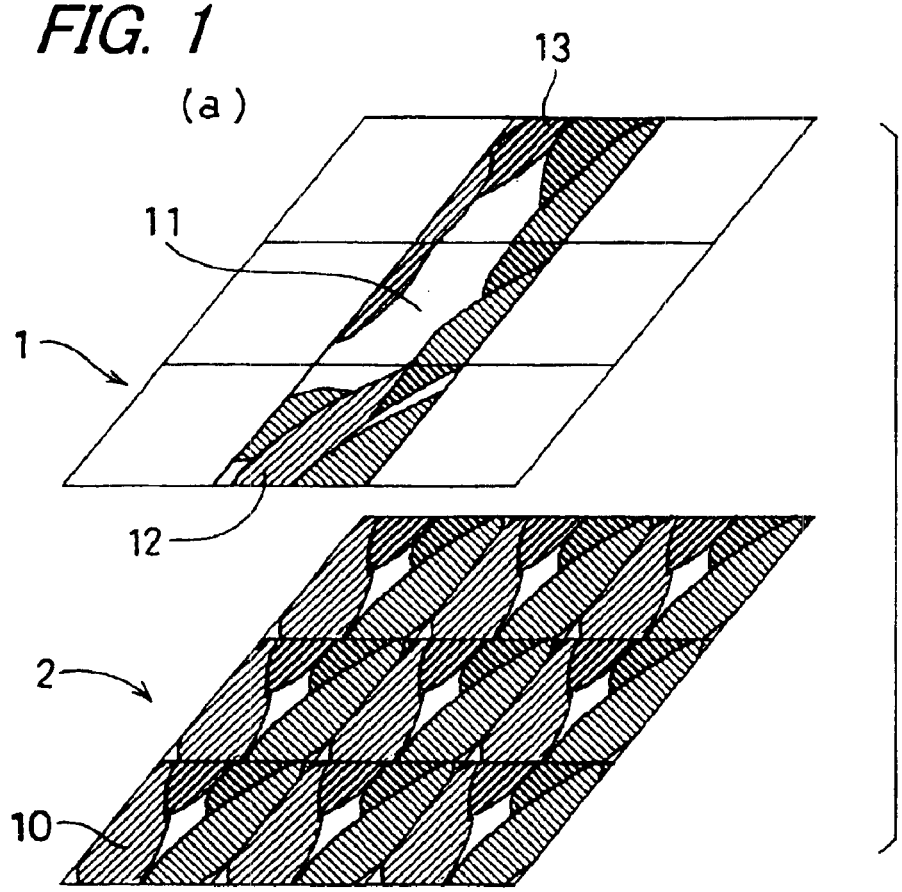
(b)
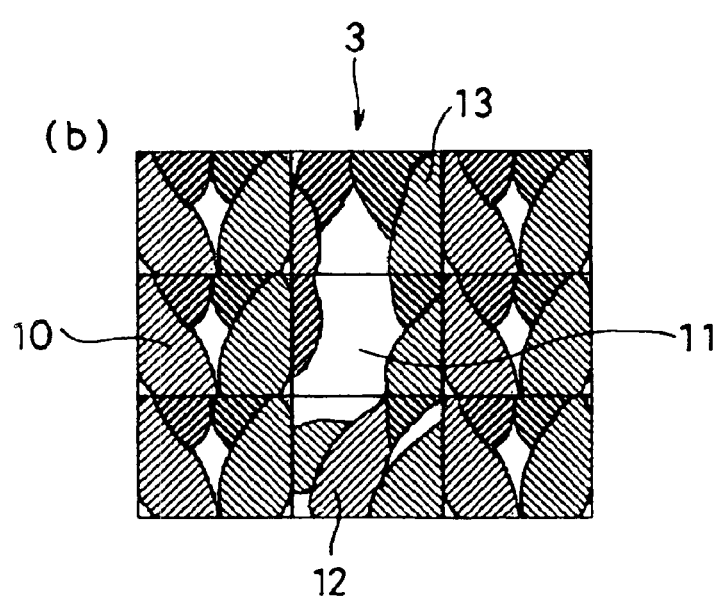

FIG. 6
(a) RIGHT FRONT STITCH
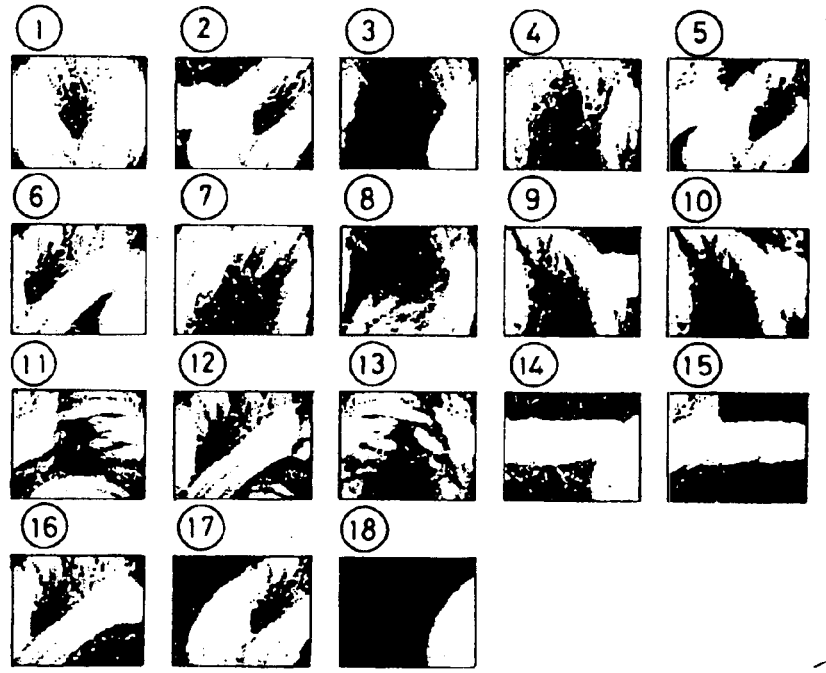
(b) LEFT FRONT STITCH
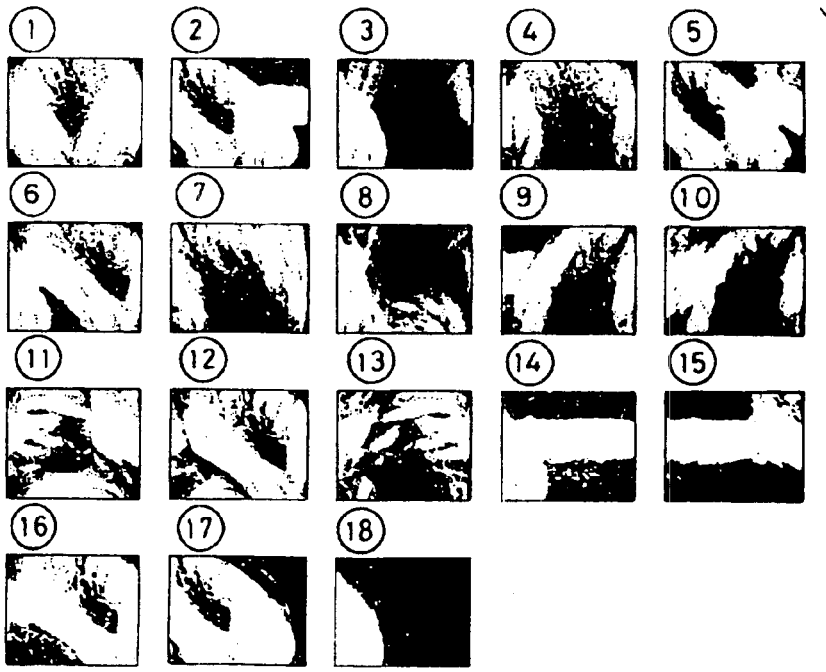

FIG. 7
(a) RIGHT BACK STITCH
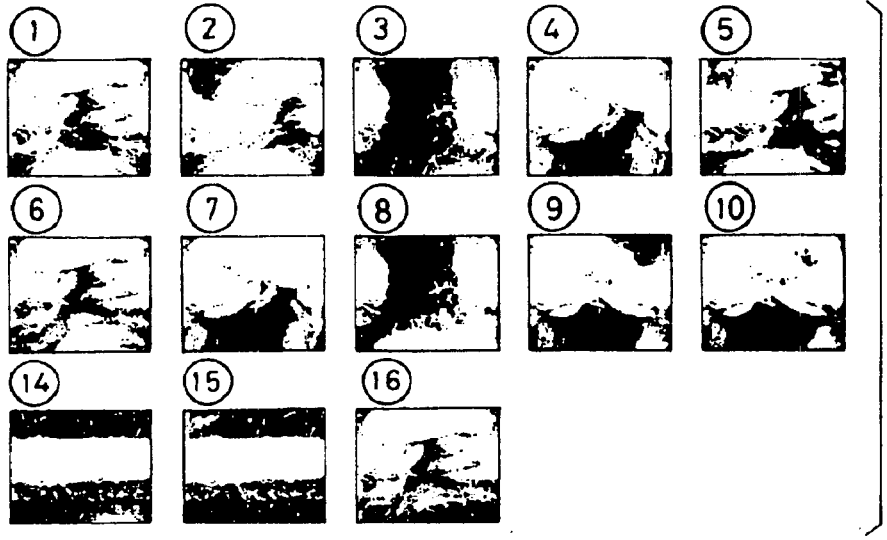
(b) LEFT BACK STITCH
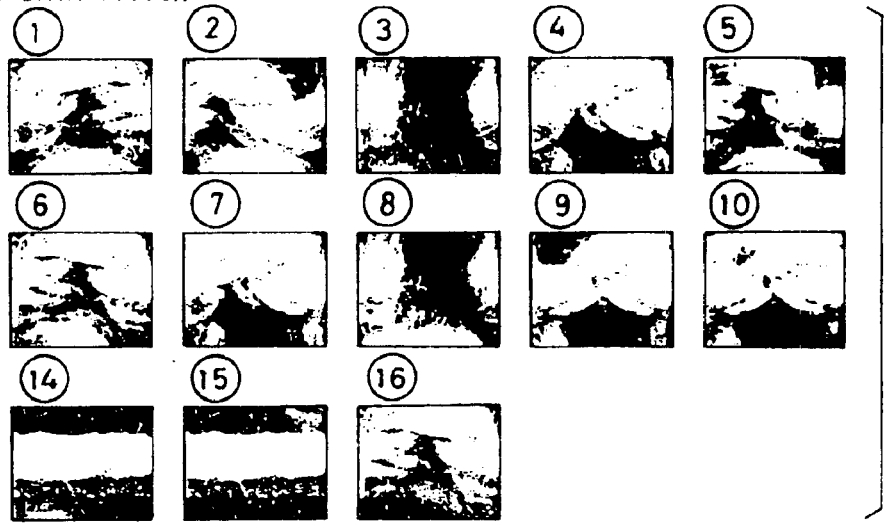
(c)
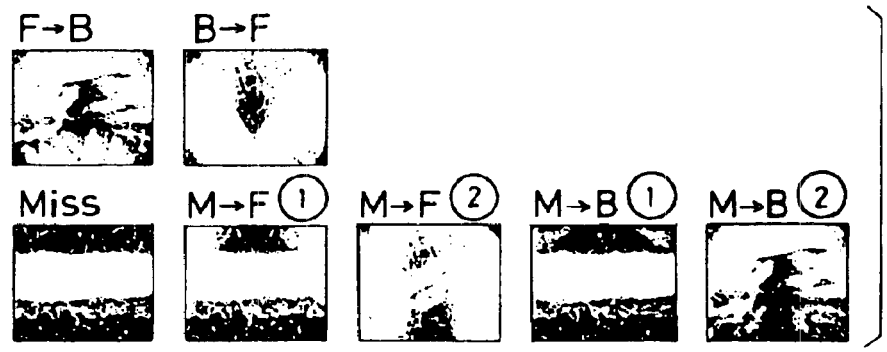

FIG. 8
(a) FRONT STITCH GATHERING TO RIGHT
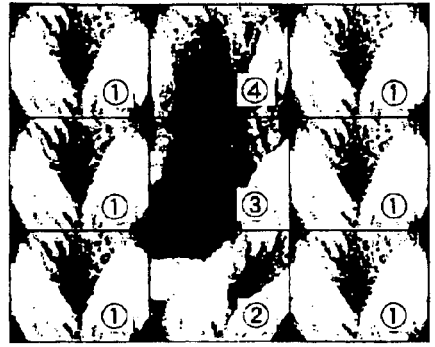 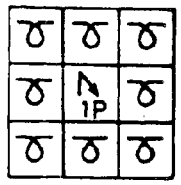
(b) BACK STITCH GATHERING TO RIGHT
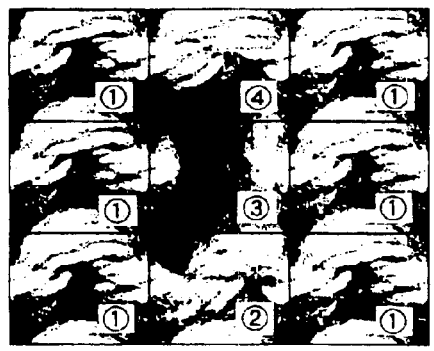 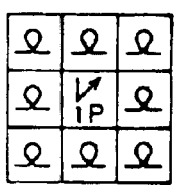
No. 1 FRONT KNIT (FRONT JERSEY STITCH)
No. 2 BACK KNIT (BACK JERSEY STITCH)
No. 7 FRONT KNIT + 1P GATHERING TO RIGHT
No. 9 BACK KNIT + 1P GATHERING TO RIGHT FIG. 9
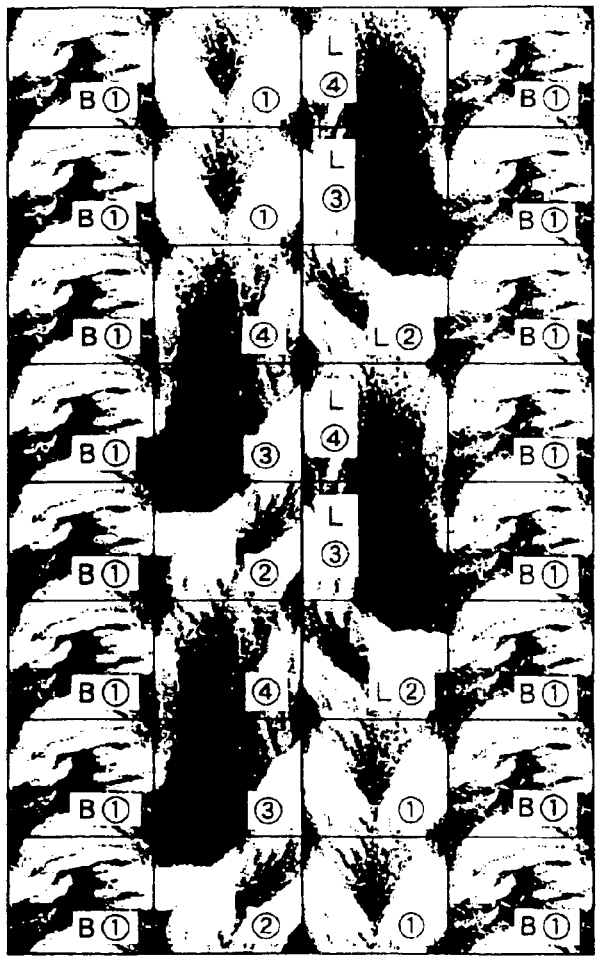 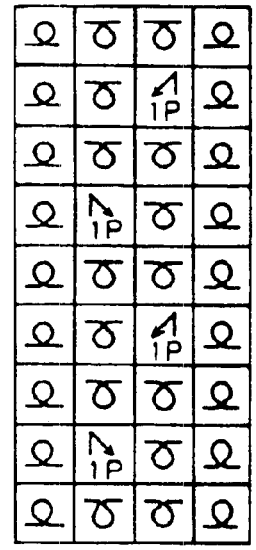
- No. 1 FRONT KNIT (FRONT JERSEY STITCH)
- No. 2 BACK KNIT (BACK JERSEY STITCH)
- No. 7 FRONT KNIT + 1P GATHERING TO RIGHT
- No. 6 FRONT KNIT + 1P GATHERING TO LEFT

CASE WHERE GATHERING IS PRESENT CONSECUTIVELY IN UPPER DIRECTION

THIS UNIT IS REPEATED

REPEATED (NUMBER OF GATHERING − 1)

No. 1 FRONT KNIT (FRONT JERSEY STITCH)
No. 7 FRONT KNIT + 1P GATHERING TO RIGHT

| | | | | | |
|---|---|---|---|---|---|
| Ω | Ω | Ω | Ω | Ω | Ω |
| Ω | Ω | Ω | Ω | Ω | Ω |
| Ω | Ω | ↗1P | ↗1P | ↗1P | Ω |
| Ω | Ω | Ω | Ω | Ω | Ω |
| Ω | ↗1P | ↗1P | ↗1P | Ω | Ω |
| Ω | Ω | Ω | Ω | Ω | Ω |
| Ω | Ω | Ω | Ω | Ω | Ω |

Ω No. 2
BACK KNIT (BACK JERSEY STITCH)

↗1P No. 9
BACK KNIT + 1P GATHERING TO RIGHT

FIG. 12
(a) CASE WHERE GATHERING TO RIGHT IS PRESENT CONSECUTIVELY IN UPPER DIRECTION
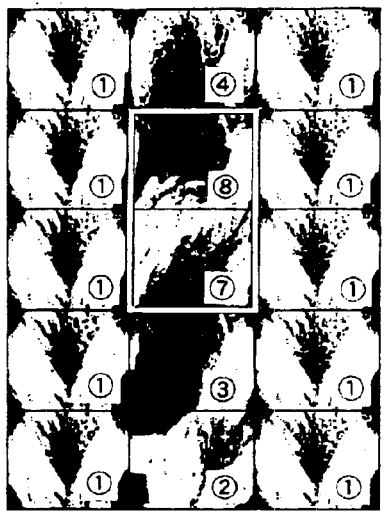
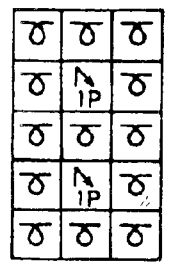
(b)
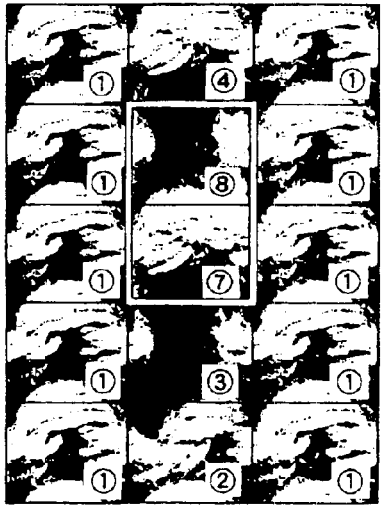
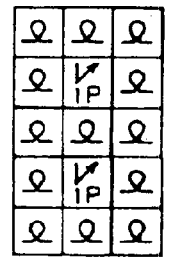
- No. 1 FRONT KNIT (FRONT JERSEY STITCH)
- No. 2 BACK KNIT (BACK JERSEY STITCH)
- No. 7 FRONT KNIT + 1P GATHERING TO RIGHT
- No. 9 BACK KNIT + 1P GATHERING TO RIGHT

FIG. 13
CASE WHERE GATHERING TO LEFT IS PRESENT
CONSECUTIVELY ABOVE GATHERING TO RIGHT
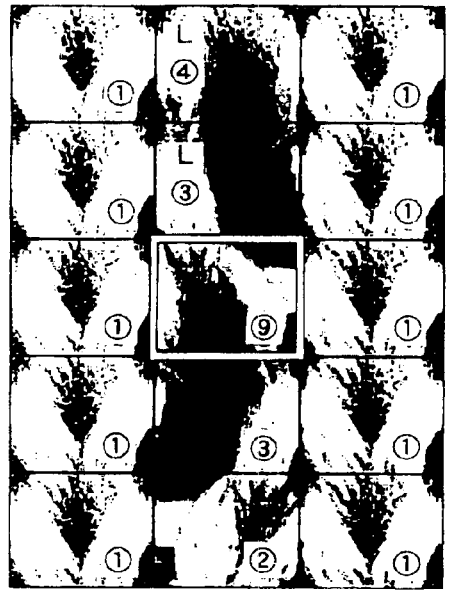
 No. 1
FRONT KNIT (FRONT JERSEY STITCH)
 No. 6
FRONT KNIT + 1P GATHERING TO LEFT
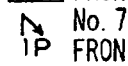 No. 7
FRONT KNIT + 1P GATHERING TO RIGHT FIG. 14
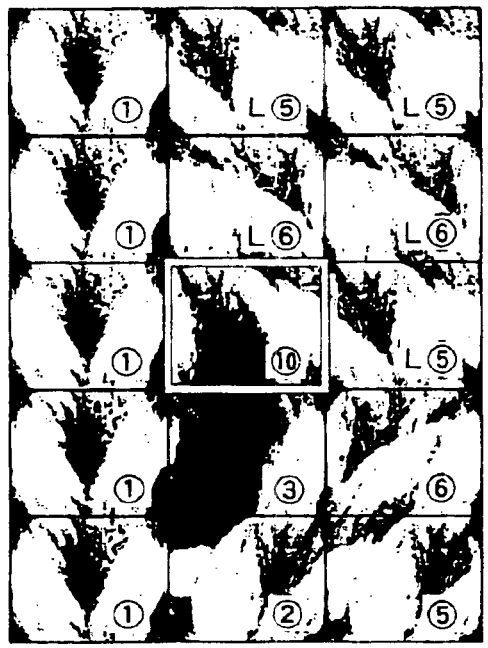 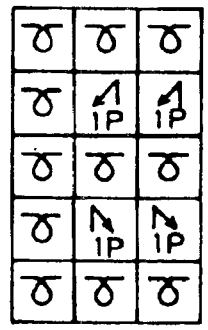
No. 1
FRONT KNIT (FRONT JERSEY STITCH)
No. 6
FRONT KNIT + 1P GATHERING TO LEFT
No. 7
FRONT KNIT + 1P GATHERING TO RIGHT

COMBINATION PROVIDES LEAF PATTERN

No. 1 FRONT KNIT (FRONT JERSEY STITCH)
No. 6 FRONT KNIT + 1P GATHERING TO LEFT
No. 7 FRONT KNIT + 1P GATHERING TO RIGHT

CASE WHERE END OF GATHERING IS OPPOSITE BETWEEN FRONT AND BACK

| | No. 1<br>FRONT KNIT (FRONT JERSEY STITCH) |
|---|---|
| | No. 2<br>BACK KNIT (BACK JERSEY STITCH) |
| | No. 6<br>FRONT KNIT + 1P GATHERING TO LEFT |
| | No. 7<br>FRONT KNIT + 1P GATHERING TO RIGHT |

| | No. 1 FRONT KNIT (FRONT JERSEY STITCH) |
| --- | --- |
| | No. 2 BACK KNIT (BACK JERSEY STITCH) |
| | No. 8 BACK KNIT + 1P GATHERING TO LEFT |
| | No. 9 BACK KNIT + 1P GATHERING TO RIGHT |

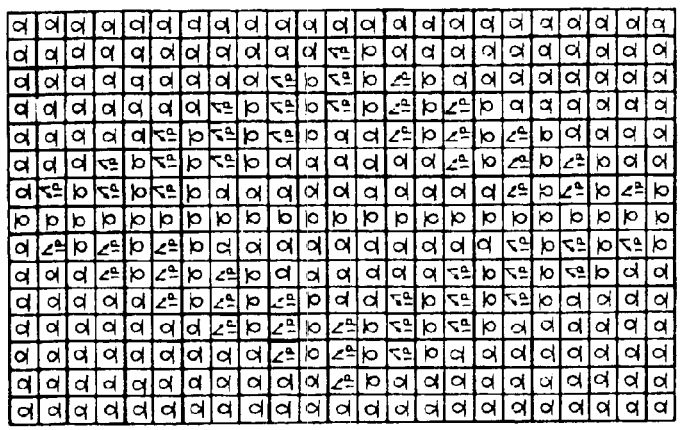
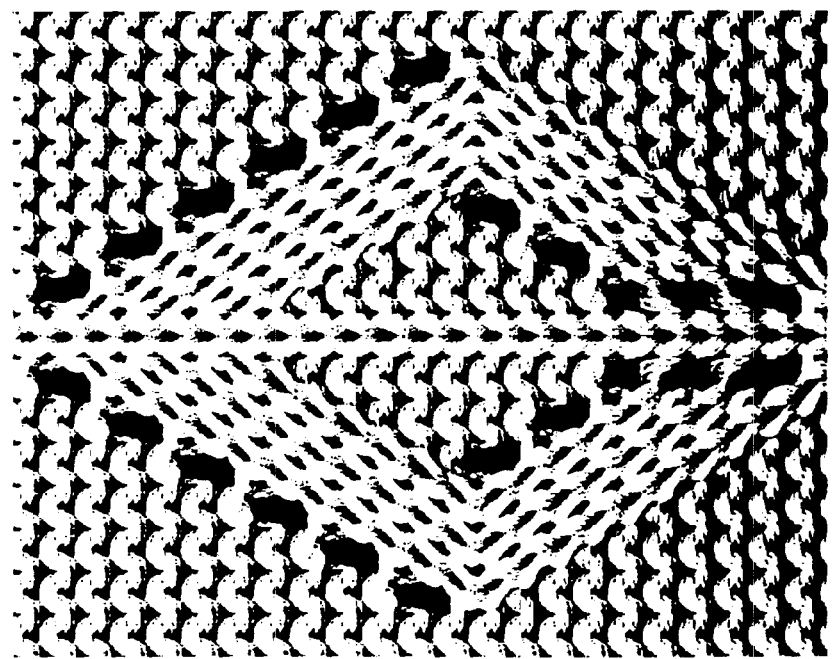
FIG. 18

CASE WHERE NEIGHBORING STITCH OF GATHERING IS MISS-STITCH

No. 1
FRONT KNIT (FRONT JERSEY STITCH)
No. 6
FRONT KNIT + 1P GATHERING TO LEFT
No. 7
FRONT KNIT + 1P GATHERING TO RIGHT
No. 16
NO NEEDLE STITCHING

⎕ No. 2
BACK KNIT (BACK JERSEY STITCH)
⎕ No. 8
BACK KNIT + 1P GATHERING TO LEFT
⎕ No. 9
BACK KNIT + 1P GATHERING TO RIGHT
⎕ No. 16
NO NEEDLE STITCHING

REPEATED NECESSARY TIMES

THIS UNIT IS REPEATED

No. 1
FRONT KNIT (FRONT JERSEY STITCH)
No. 7
FRONT KNIT + 1P GATHERING TO RIGHT
No. 16
NO NEEDLE STITCHING

FIG. 24
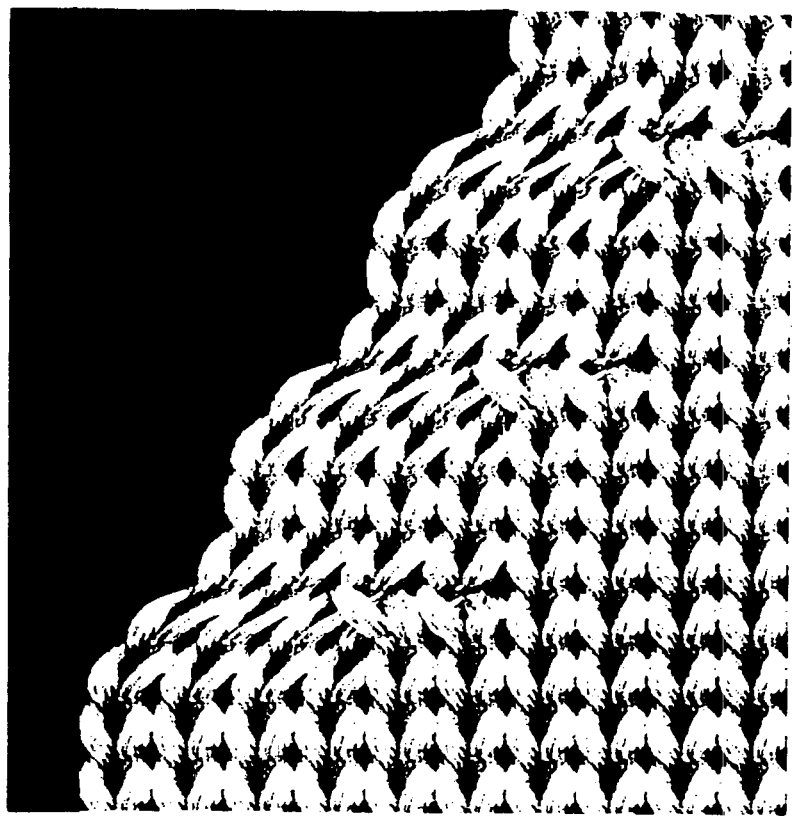
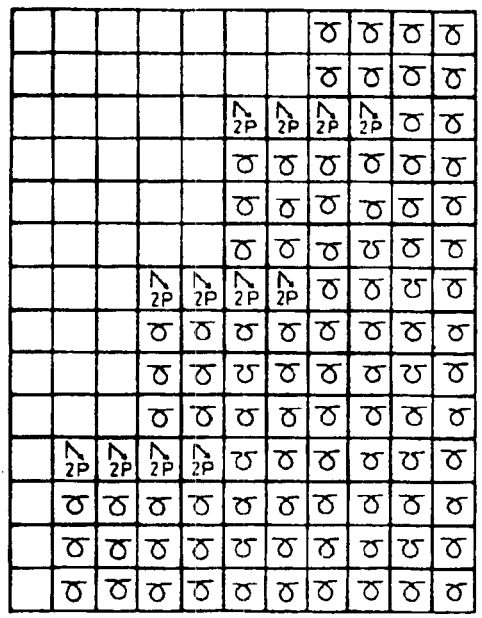
☐ No. 1
☐ FRONT KNIT (FRONT JERSEY STITCH)
☐ No. 72
☐ FRONT KNIT + 2P GATHERING TO RIGHT

FIG. 25
2P GATHERING TO RIGHT
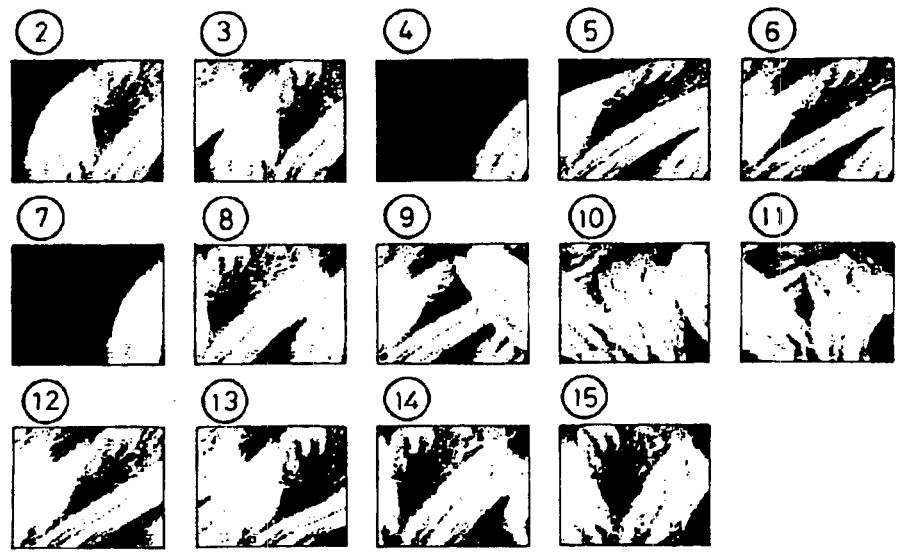
HEMMING STITCH
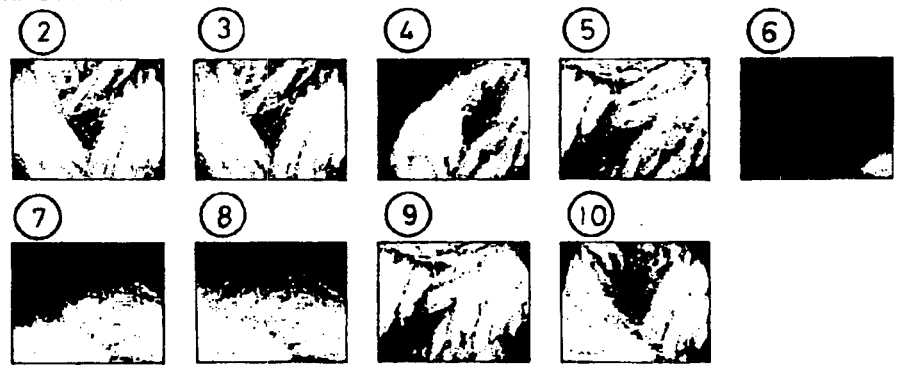

FIG. 26
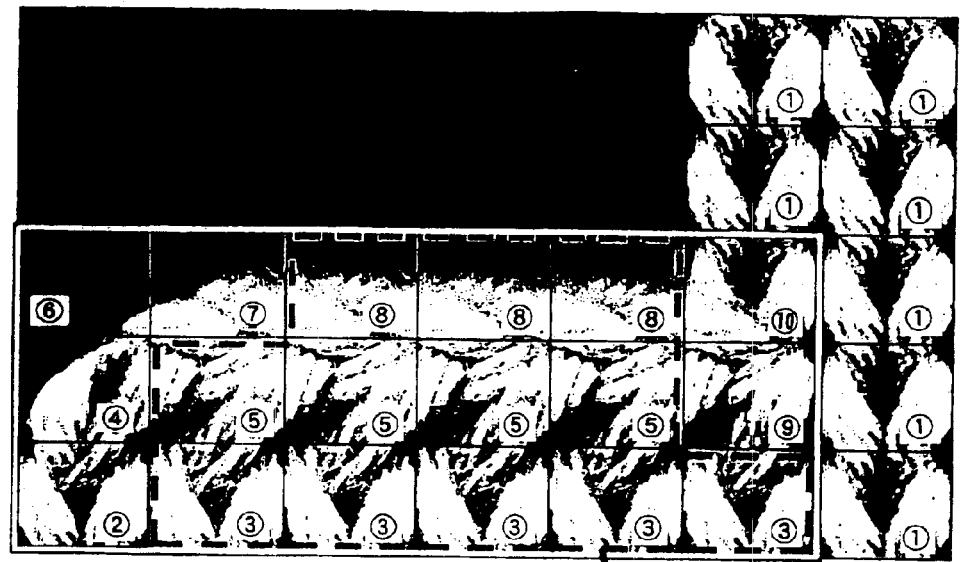
REPEATED IN ACCORDANCE WITH NUMBER OF STITCHES
| ☐ | No. 1 FRONT KNIT (FRONT JERSEY STITCH) |
| V | No. 187 |
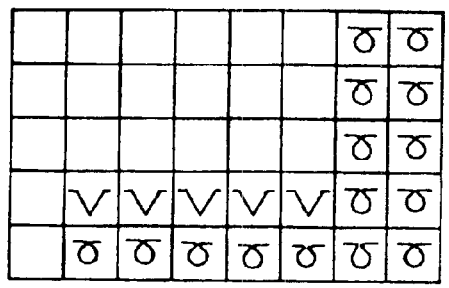
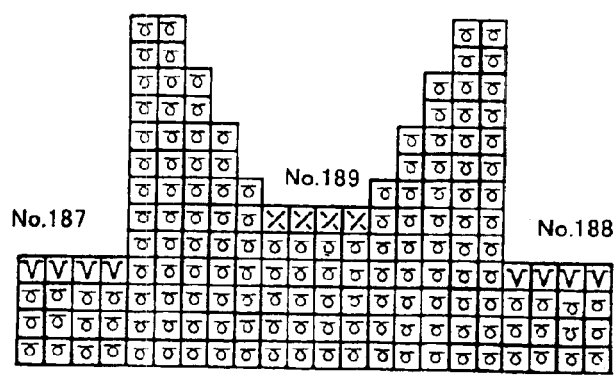

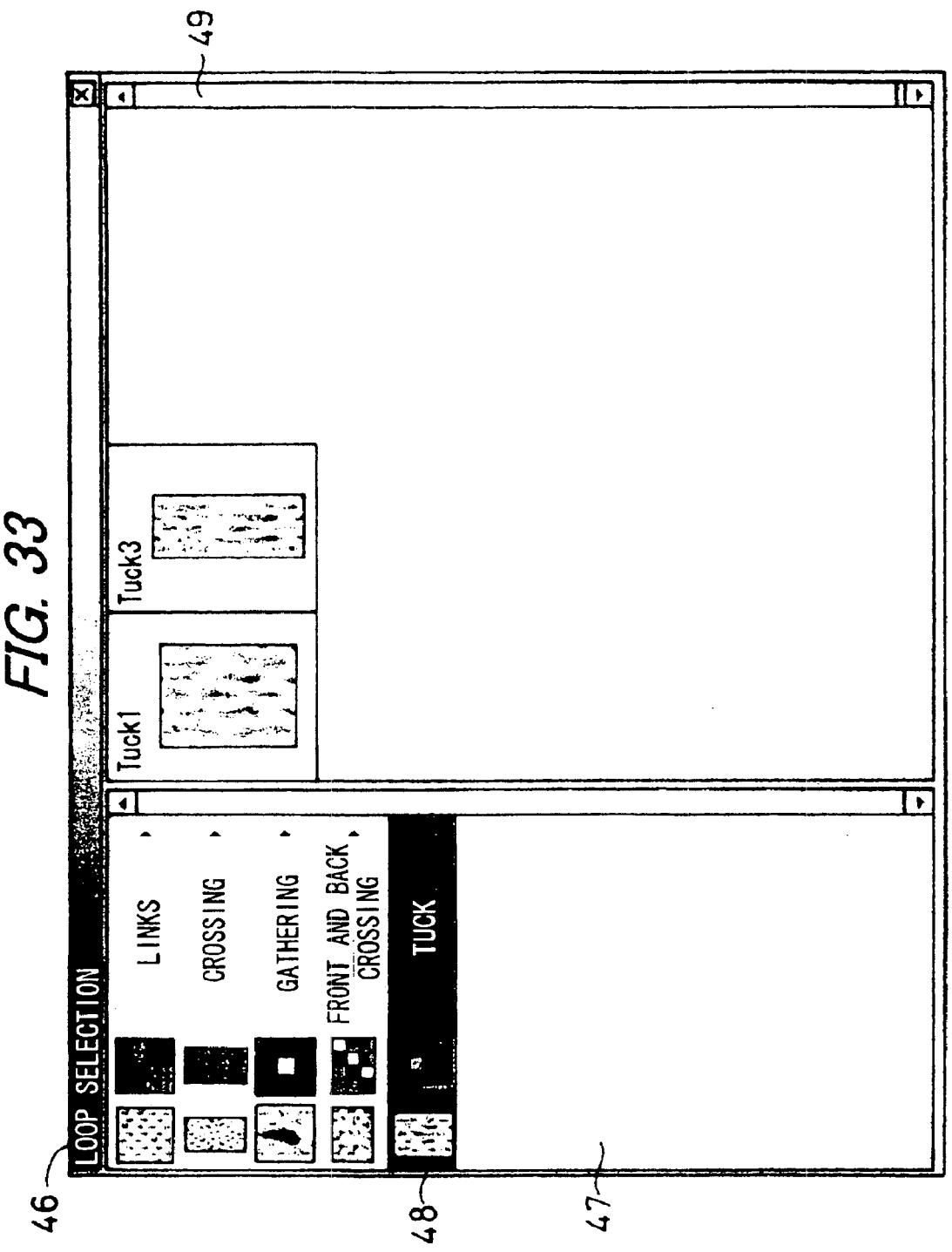

KNIT DESIGN METHOD AND APPARATUS

TECHNICAL FIELD

The present invention relates to a knit design method and apparatus that can simulate and display images of a knitted fabric of a knitted product.

BACKGROUND ART

Conventionally, in designing knitted fabrics of kitted products, methods of representation for making knitted fabrics such as knitting stitch symbols or knitting symbols defined by, for example, JIS L 0200 of the Japanese Industrial Standard, are used. The knitting stitch symbols are symbols indicating textures of various knitting stitches such as front knitting stitches, back knitting stitches, front tuck knitting stitches, back tuck knitting stitches, float stitches and transfer stitches. The knitting symbols are symbols indicating the order of knitting with a needle corresponding to each knitting stitch symbol. The methods of representation for making knitted fabrics designate individual knitting stitch constituting a knitted fabric, and according to this designation, knitting data for making a knitted fabric with an automatic flat knitting machine can be generated.

The applicant has proposed in Japanese Unexamined Patent Publication JP-A 60-71748 (1985) a technique for generating knitting data for an automatic flat knitting machine with color codes represented that are substituted for the knitting stitch symbols. Substituting color codes for the knitting stitch symbols makes it easy to design a knitted fabric by image processing with a computer, and textures of more kinds of knitting stitches can be displayed on displaying means, using a large number of colors.

The applicant also has proposed in Japanese Unexamined Patent Publication JP-A 7-70890 (1995) a technique for generating loop images of knitting stitches constituting a knitted fabric by simulation, utilizing data for making a knitted fabric, and displaying the simulated images of the knitted fabric. Furthermore, in Japanese Unexamined Patent Publication JP-A 9-111617 (1997), a technique for disintegrating image data into a plurality of layers and allowing display of the priority and grouping of the layers so as to facilitate designing when performing knit design for generating data for making a knitted fabric has been proposed.

In the case of performing knit design, when the methods of representation for making a knitted fabric are used, the displayed images do not necessarily reflect faithfully the appearance of the actual knitted fabric that is knitted according to the data for making a knitted fabric. Therefore, a designer who designs a knitted fabric with data for making a knitted fabric has to have an ability of imagining the appearance of the actual knitted fabric in designing, and the knitted fabric cannot be designed intuitionally.

When the simulation of a knitting stitch loop proposed in JP-A 7-70890 is used, it is possible to design an actual knitted fabric intuitionally. In this technique, image processing is performed in the following manner. Image data of knitting yarns are stored in advance, and the shape and the position of each loop of knitting stitches, the brightness of each portion and the like are determined based on data for making a knitted fabric, and the loop is divided into a plurality of segments, and synthesized as a loop corresponding to segmented image data of the knitting yarn. Therefore, the process takes time, and the followingness of image display with respect to an operation of design modification or the like is not sufficient. In a knitted fabric knitted by an actual flat knitting machine, the shape of a knitting stitch in an earlier knitted course is transformed by the effect of the shape of a knitting stitch in a later knitted course. However, such transformation cannot be reflected appropriately.

DISCLOSURE OF INVENTION

It is an object of the invention to provide a knit design method and apparatus that can display rapidly images of knitting stitches that are close to those of the actually made knitted fabric.

The invention provides a knit design method for designing a knitted fabric while displaying an image of the knitted fabric, comprising:

allowing designing a knitted fabric by combining an image representing a shape of a basic knitting stitch for making a predetermined basic knitted fabric and an image representing a shape of a knitting stitch for a pattern for forming a texture pattern by changing a knitting stitch of the knitted fabric from the shape of the basic knitting stitch;

allowing generating a plurality of kinds of images of transformed knitting stitches representing a shape of a knitting stitch in a periphery of the knitting stitch for a pattern that is transformed in accordance with a position by an influence of making the knitting stitch for a pattern, based on a combination of the basic knitting stitch and the transformed knitting stitch;

substituting an image selected from the plurality of images of transformed knitting stitches in accordance with a position of a knitting stitch for the knitting stitch in the periphery of the knitting stitch for a pattern, based on a predetermined corresponding relationship when design of the knitted fabric is performed by combining the basic knitting stitch and the knitting stitch for a pattern; and displaying the image of the knitted fabric as an image obtained by combining the basic knitting stitch, the knitting stitch for a pattern and the transformed knitting stitch.

Furthermore, the invention is characterized in that the design of the knitted fabric is performed by previously registering pattern designs in a library, the pattern designs being obtained by combining the basic knitting stitch, the knitting stitch for a pattern and the transformed knitting stitch so as to include a basic knitted fabric in which the basic knitting stitches are arranged and a pattern knitted fabric in which the knitting stitches for a pattern are arranged as opposed to the basic knitting stitches and the transformed knitting stitches are substituted for the stitches in the periphery, selecting a pattern design registered in the library, and editing the selected pattern design.

Furthermore, the invention is characterized in that the image of the knitted fabric is displayed by synthesizing images of the pattern design that are divided and assigned into a plurality of layers, a degree of priority is assigned to each layer, and when images are present at a position of knitting stitches corresponding between the layers, the image of the knitting stitch of the layer having the highest priority is displayed, and an operation of changing the position and the shape of the image of the knitting stitch can be performed for editing in each layer.

Furthermore, the invention is characterized in that at least a portion of the images of the basic knitting stitches, the knitting stitches for a pattern or the transformed knitting stitches is obtained by imaging an actual knitted fabric in advance and stored as image data.

Furthermore, the invention is characterized in that at least a portion of the basic knitting stitches, the knitting stitches for a pattern or the transformed knitting stitches is created utilizing computer graphics in advance, and stored as image data.

Furthermore, the invention is characterized in that the knitted fabric displayed as an image and information for making a knitted fabric can be mutually converted, based on a corresponding relationship between the basic knitting stitches and the knitting stitches for a pattern and a preset method for representing knitting stitches for making a knitted fabric.

Furthermore, the invention provides a program for executing any one of the above-described knit design method on a computer.

Furthermore, the invention provides a knit design apparatus for designing a knitted fabric while displaying an image of the knitted fabric on image displaying means, comprising:

knitting stitch image storing means for previously storing image data representing an image representing a shape of a basic knitting stitch for making a predetermined basic knitted fabric, an image representing a shape of a knitting stitch for a pattern for forming a texture pattern by changing a knitting stitch of the knitted fabric from the shape of the basic knitted stitch, and a plurality of images of transformed knitting stitches representing a shape of a knitting stitch in a periphery of the knitting stitch for a pattern that is transformed in accordance with a position by an influence of making the knitting stitch for a pattern;

knitted fabric information inputting means for inputting information for forming the image of the knitted fabric by combining the basic image and the pattern image stored in the knitting stitch storing means;

knitting stitch image transforming means for substituting the image of the transformed knitting stitch stored in the knitting stitch image storing means for the image representing the knitting stitch made in the periphery of the pattern image in the knitted fabric based on a predetermined corresponding relationship, in response to the information input to the knitted fabric information inputting means; and knitted fabric image displaying means for displaying the image of the knitted fabric on the image displaying means by combining the images of the basic knitting stitches, the knitting stitches for a pattern and the transformed knitting stitches.

Furthermore, the invention is characterized by further comprising:

library registration means for allowing previously registering pattern designs obtained by combining the basic knitting stitch, the knitting stitch for a pattern and the transformed knitting stitch so as to include the basic knitted fabric in which the basic knitting stitches are arranged and a pattern knitted fabric in which the knitting stitches for a pattern are arranged as opposed to the basic knitting stitches and the transformed knitting stitches are substituted for the stitches in the periphery, in a form of module, wherein the knitted fabric information inputting means includes knitted fabric editing means capable of performing editing work including selecting a pattern design registered in the library registration means and changing the size of the selected pattern design and/or the number of repetitions.

Furthermore, the invention is characterized in that the knitted fabric image displaying means allows the image of the knitted fabric to be displayed by dividing images of knitting stitches into a plurality of layers and assigning a degree of priority to each layer, and displaying the image of the knitting stitch of the layer having the highest priority when images are present at a position of knitting stitches corresponding between the layers, and the knitted fabric editing means can perform an editing operation of generating and deleting an image of a knitting stitch and changing the position and the shape of the generated knitting stitch in each layer.

Furthermore, the invention is characterized by further comprising:

synthesized knitted fabric converting means for converting the knitted fabric displayed by the image displaying means into information for making a knitted fabric, based on a corresponding relationship between the basic knitting stitches and the knitting stitches for a pattern and the preset method for representing knitting stitches for making a knitted fabric, wherein the knitted fabric information inputting means includes knitted fabric information converting means for converting the information for making a knitted fabric according to the method for representing knitting stitches to a combination of the basic knitting stitch and the knitting stitch for a pattern.

BRIEF DESCRIPTION OF DRAWINGS

Other and further objects, features, and advantages of the invention will be more explicit from the following detailed description taken with reference to the drawings:

FIG. 1 is a diagram showing the basic concept of simulation of a knit design method of one embodiment of the invention;

FIG. 6 is a view showing element images of knitting stitches previously prepared in the means 22 for storing knitting stitch images of FIG. 3;

FIG. 7 is a view showing element images of knitting stitches previously prepared in the means 22 for storing knitting stitch images of FIG. 3;

FIG. 8 is a view showing the images of a simulated knitted fabric that are displayed in comparison with data for making knitting stitches in this embodiment;

FIG. 9 is a view showing the images of a simulated knitted fabric that are displayed in comparison with data for making knitting stitches in this embodiment;

FIG. 12 is a view showing the images of a simulated knitted fabric that are displayed in comparison with data for making knitting stitches in this embodiment;

FIG. 13 is a view showing the images of a simulated knitted fabric that are displayed in comparison with data for making knitting stitches in this embodiment;

FIG. 14 is a view showing the images of a simulated knitted fabric that are displayed in comparison with data for making knitting stitches in this embodiment;

FIG. 18 is a view showing the images of a simulated knitted fabric that are displayed in comparison with data for making knitting stitches in this embodiment;

FIG. 24 is a view showing the images of a simulated knitted fabric that are displayed in comparison with data for making knitting stitches in this embodiment;

FIG. 25 is a view showing element images of knitting stitches previously prepared in the means 22 for storing knitting stitch images of FIG. 3;

FIG. 26 is a view showing the images of a simulated knitted fabric that are displayed in comparison with data for making knitting stitches in the this embodiment;

FIG. 33 is a view showing an example of a screen displayed in means 19 for displaying images at the time of selecting a pattern design at the editing work by the means 26 for editing a knitted fabric of FIG. 3.

BEST MODE FOR CARRYING OUT THE INVENTION

Figure 2:
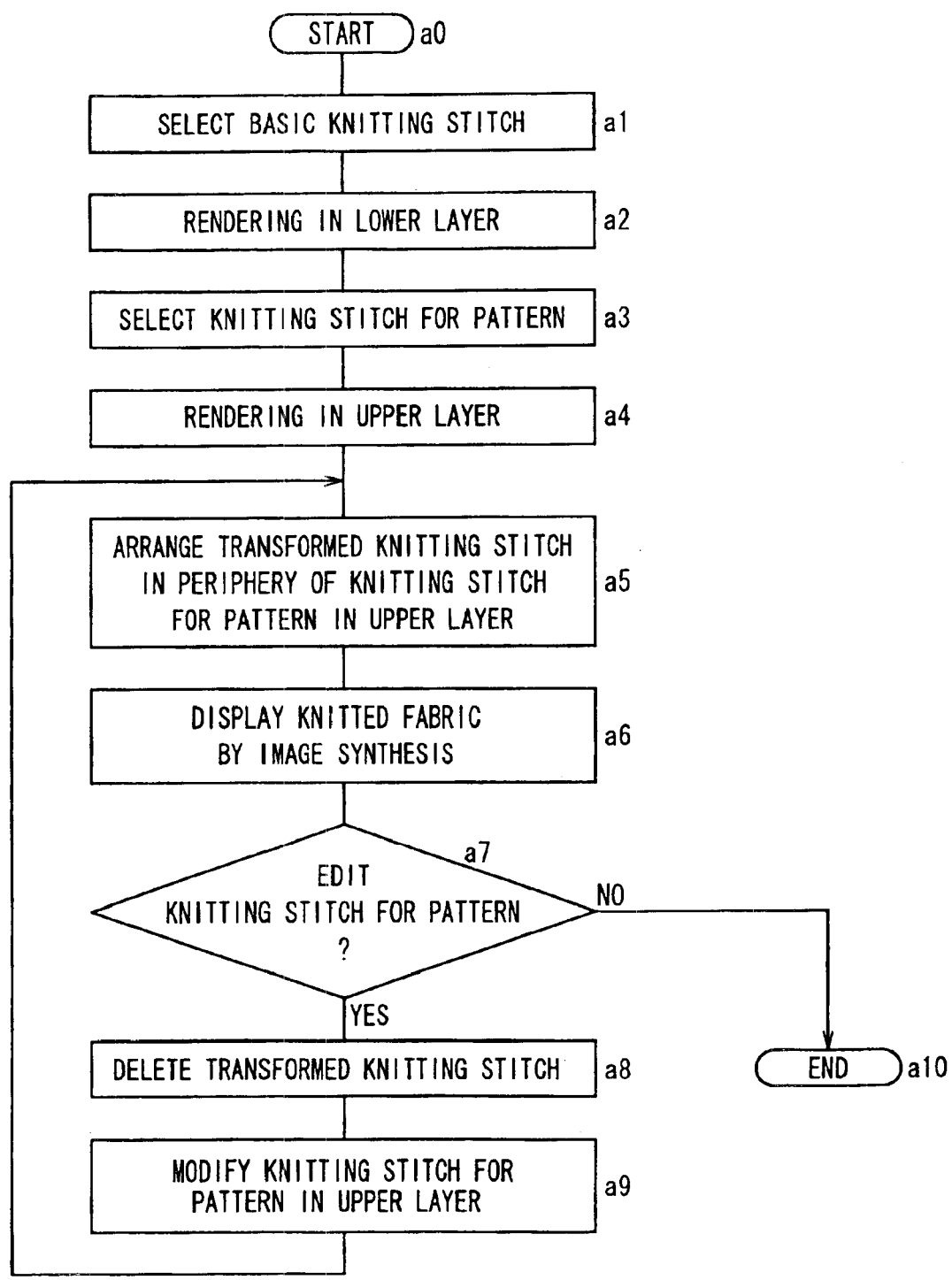
FIG. 2 is a flowchart showing the procedure of simulating a knitted fabric with images based on the concept of FIG. 1.

Now referring to the drawings, preferred embodiments of the invention are described below in details.

FIG. 1 shows the basic concept of simulation of a knit design method of one embodiment of the invention. In this embodiment, as shown in FIG. 1(*a*), images of knitting stitches are processed for rendering while dividing the images into a plurality of layers, for example, an upper layer 1 and a lower layer 2. As shown in FIG. 1(*b*), the design of a knitted fabric is performed while displaying a knitted fabric image 3. A degree of priority is assigned to each layer of a plurality of layer, and when an image is present at a position of the knitting stitches corresponding between the layers, the image of the knitting stitch of the layer having the highest priority is displayed. In each layer, it is possible to perform an editing operation for changing the position and the shape of the image of the knitting stitches. Knitting stitch images to be arranged in each layer are previously prepared, and images are selected and arranged to form a pattern. Then, the transformation state caused by the pattern is simulated in the periphery of the area of the knitting stitches in which the pattern is arranged, and a transformed image is selected and arranged.

Herein, it is assumed that knitting is performed sequentially from the bottom to the top, taking the horizontal direction in the drawings as the direction of the course of a knitted fabric to be knitted by a flat knitting machine. In the lower layer 2, basic knitting stitches 10 such as a front jersey stitch by front knit are selected and arranged uniformly. In the upper layer 1, for example, a knitting stitch for a pattern 11 that is gathered to the right for one pitch is arranged. In the knitting stitch for a pattern 11, when a knitting stitch loop is displaced to the right for one pitch, the knitting stitch in the preceding course that is already knitted and the knitting stitch in the later knitted course are transformed from the shape of the basic stitch 10 or the like, because the knitting yarns are pulled laterally. In the present embodiment, the shapes of the transformed knitting stitches are also previously prepared as transformed knitting stitches 12, and 13, for example. When the knitting stitch images in the upper layer 1 and the lower layer 2 are synthesized, the images of the knitting stitch for a pattern 11 and the transformed knitting stitches 12 and 13 in the upper layer have the higher priority over the image of the basic knitting stitch 10 of the lower layer 2, and thus a knitted fabric image 3 as shown in FIG. 1(*b*) can be obtained.

The images of at least a portion of the basic knitting stitch 10, the knitting stitch for a pattern 11 or the transformed knitting stitches 12 and 13 can be stored as image data by previously imaging an actual knitted fabric. Furthermore, the images of at least a portion of the basic stitch 10, the knitting stitch for a pattern 11 or the transformed knitting stitches 12 and 13 also can be created by previously utilizing computer graphics and stored as image data. In addition, the images can be formed by transforming or modifying the image data obtained by actual imaging, utilizing computer graphics.

FIG. 2 shows the procedure of performing simulation to produce the knitted fabric image 3 shown in FIG. 1(b) based on the basic concept of FIG. 1. The procedure starts from step a0, and the basic knitting stitch 10 is selected in step a1. As the basic stitch 10, it is possible to select front jersey stitches by the front knit as shown in FIG. 1, back jersey stitches, rib stitches, a links pattern or the other knitting stitch in which either of front stitches or back stitches is present or both of them are present equally. In step a2, the selected basic knitting stitch 10 is processed for rendering in the lower layer 2. In step a3, the knitting stitch for a pattern 11 is selected. In step a4, the selected knitting stitch for a pattern 11 is arranged in the upper layer 1. In step a5, the transformed knitting stitches 12 and 13 are arranged based on the predetermined relationship in a part of or the entire of the periphery of the area of the upper layer 1 in which the knitting stitch for a pattern 11 is arranged, with reference to the basic knitting stitch 10 in the lower layer 2 corresponding to the periphery of the area of the upper layer 1 in which the knitting stitch for a pattern 11 is arranged. In step a6, the images of the upper layer 1 and the lower layer 2 are synthesized, and the knitted fabric image 3 as shown in FIG. 1(b) is displayed, with placing the higher priority on the upper layer 1.

In step a7, the designer determines whether or not further editing should be performed, when looking at the displayed knitted fabric image 3. For further editing, a predetermined operation or the like is performed, the procedure goes to step a8, and the transformed knitting stitches 12 and 13 are deleted from the upper layer 1. In step a9, the editing operation of, for example, modifying the position or the shape of the knitting stitch for a pattern 11 in the upper layer 1 is performed, and the procedure returns to step a5. In step a5, the transformed knitting stitches 12 and 13 are arranged again in the periphery of the modified knitting stitch for a pattern 11. In step a7, if the designer determines that editing should no longer be performed-when looking at the knitted fabric image 3, the procedure ends with step a10. Since the editing operation with respect to the knitting stitch for a pattern 11 is performed to the upper layer 1, which is different from the lower layer 2 in which the basic knitting stitch 10 is arranged, the editing with respect to the upper layer 1 does not affect the lower layer 2, so that switching between editing and synthesis can be performed rapidly.

Figure 3:
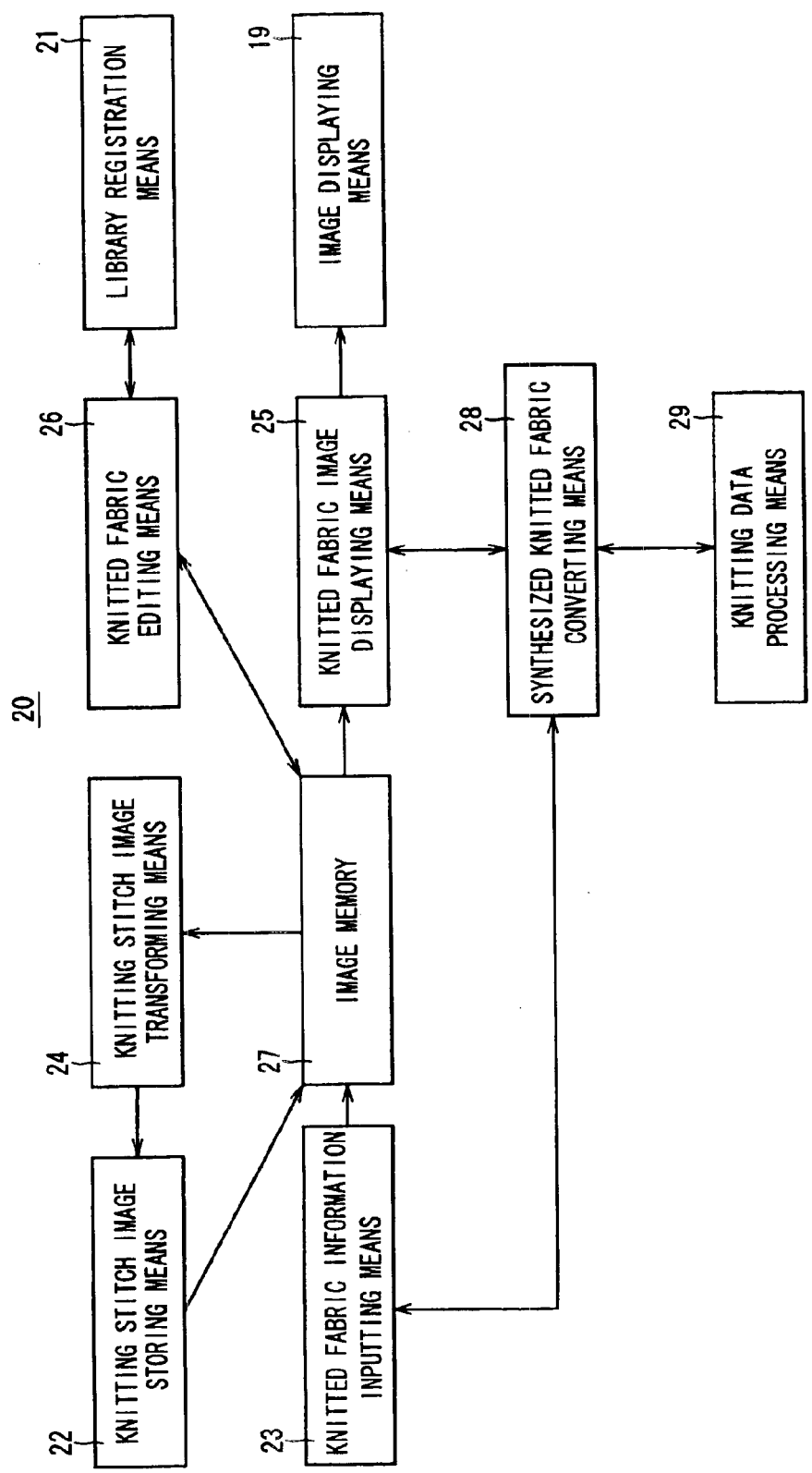
FIG. 3 is a block diagram showing a schematic functional configuration of a knit design apparatus 20 that implements the knit design method of FIG. 1.

FIG. 3 shows a schematic functional configuration of a knit design apparatus 20 that implements the knit design method based on the basic concept of FIG. 1 and generates the knitted fabric image 3 to be displayed on image displaying means 19. The knit design apparatus 20 includes library registration means 21, knitting stitch image storing means 22, knitted fabric information inputting means 23, knitting stitch image transforming means 24, knitted fabric image displaying means 25, knitted fabric editing means 26, an image memory 27, synthesized knitted fabric converting means 28 and knitting data processing means 29.

In the library registration means 21, it is possible to previously resister pattern designs obtained by combining the basic knitting stitch 10, the knitting stitch for a pattern 11 and the transformed knitting stitches 12 and 13 so as to include a basic knitted fabric in which the basic knitting stitches 10 are arranged and a pattern knitted fabric in which the knitting stitches for a pattern 11 are arranged as opposed to the basic knitting stitch 10 and the transformed stitches 12 and 13 are substituted for the stitches in the periphery, in the form of module. In the knitting stitch image storing means 22, an image representing the shape of the basic knitting stitch 10 for making a predetermined basic knitted fabric, a pattern image representing the shape of the knitting stitch for a pattern 11 for forming a texture pattern by changing the knitting stitch of the knitted fabric from the shape of the basic knitting stitch 10, and an image of the transformed stitches 12 and 13 representing the shape of the knitting stitches knitted in the periphery of the knitting stitch for a pattern 11 that are transformed by the influence of making the knitting stitch for a pattern 11 are stored previously as elements of image data. Information for forming a knitted fabric by combining the basic knitting stitch 10 and the knitting stitch for a pattern 11 stored in the knitting stitch image storing means 22 is inputted to the knitted fabric information inputting means 23. The knitting stitch image transforming means 24 substitutes the transformed knitting stitches 12 and 13 stored in the knitting stitch image storing means 22 for the knitting stitches knitted in the periphery of the area of the knitting stitch for a pattern 11 of the knitted fabric, based on a predetermined corresponding relationship, in response to the information input to the knitted fabric information inputting means 23. The knitted fabric image displaying means 25 displays the knitted fabric image 3 on the image displaying means 19 by combining the image of the basic knitting stitch 10, the image of the knitting stitch for a pattern 11 and the image of the transformed knitting stitches 12 and 13.

The knitted fabric image displaying means 25 allows image 3 of the knitted fabric to be displayed by dividing images of knitting stitches into a plurality of layers and assigning a degree of priority to each layer, and displaying the image of the knitting stitch of the layer having the highest priority when images are present at a position of knitting stitches corresponding between the layers. The number of the layers is not limited to two, that is, the upper layer 1 and the lower layer 2, but a larger number of layers can be used. The knitted fabric editing means 26 can edit images of knitting stitches rendered in a layer structure in the image memory 27. The knitting stitch editing means 26 can perform an editing operation of changing the position and the shape of the image of the knitting stitches in each layer, and can set again the images or the degree of priority between the layers.

Furthermore, the synthesized knitted fabric converting means 28 converts the knitted fabric image 3 synthesized by the knitted fabric image synthesizing means 25 into information for making a knitted fabric, based on the corresponding relationship between the basic knitting stitch 10 and the knitting stitch for a pattern 11 and the preset method for representing knitting stitches for making a knitted fabric. For the knitted fabric information inputting means 23, information for making a knitted fabric according to the method for representing knitting stitches is converted into information for forming images of knitted fabric by combining the image of the basic knitting stitch 10 and the image of the knitting stitch 11 for a pattern. Therefore, design or information creation for making a knitted fabric can be easily performed by mutually converting simulation images of a knitted fabric and information for making a knitted fabric, based on the corresponding relationship between the basic knitting stitch 10 and the knitting stitch for a pattern 11 and the preset method for representing knitting stitches for making a knitted fabric.

Figure 4:
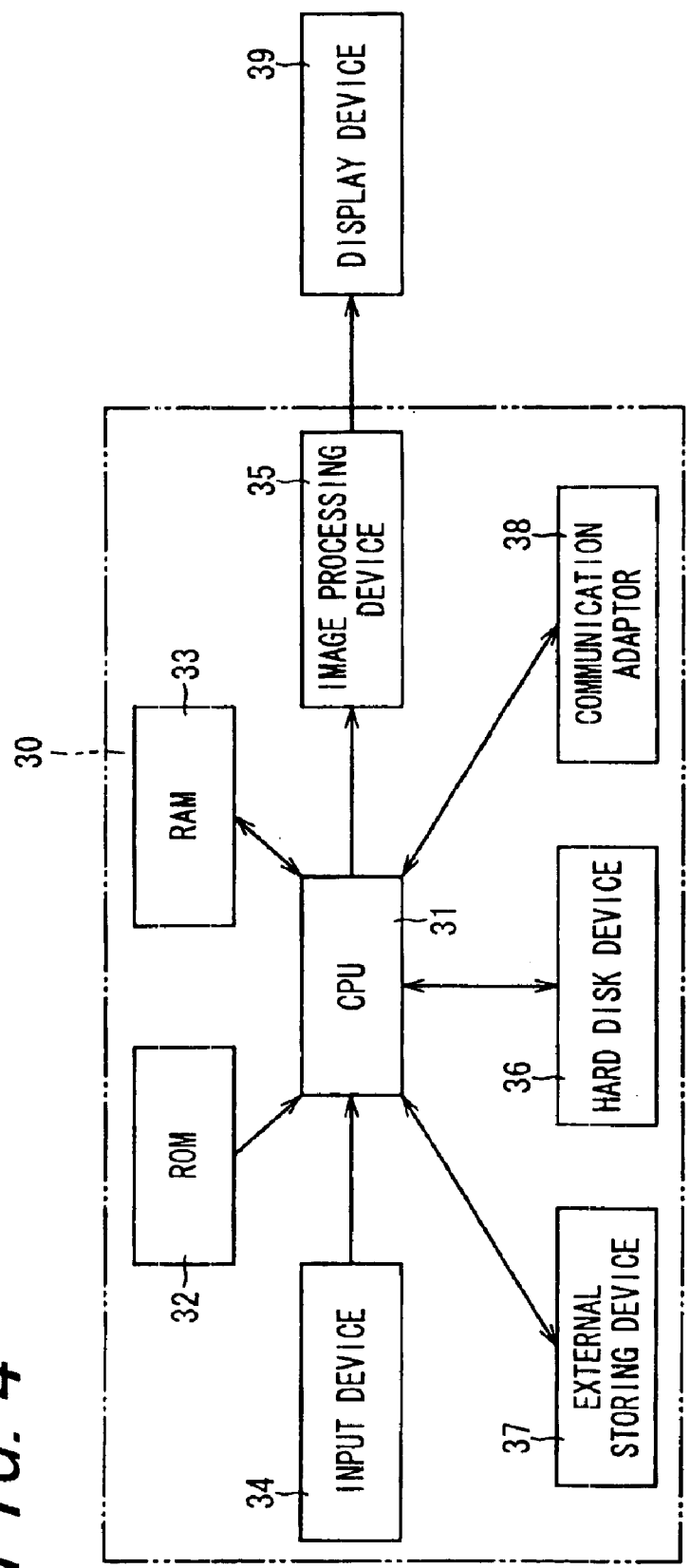
FIG. 4 is a block diagram showing a schematic electrical configuration of a computer apparatus 30 that can serve as the knit design apparatus 20 of FIG. 3.

FIG. 4 shows a schematic electrical configuration of a computer apparatus 30 that can function as the knit design apparatus 20 of FIG. 3. In the computer apparatus 30, a CPU 31 functions as the knit design apparatus 20 of FIG. 3 according to programs previously stored in a ROM 32 or programs deployed in a RAM 33. An input device 34 receives instructions or operations from the designer. A keyboard or a pointing device such as a mouse, a trackball, and a pen tablet can be used as the input device 34. The images of a knitting stitch or a knitted fabric are processed in an image-processing device 35. A hard disk device 36 stores programs deployed in the RAM 33 or stores image data of a knitting stitch, serving as the library registration means 21 or the knitting stitch image storing means 22 of FIG. 3. An external storing device 37, to/from which a recording medium is attached/removed, is used to deliver data for making a knitted fabric or deliver programs or image data. Data or programs can be downloaded from an information communication network such as the internet via a communication adaptor 38. The images outputted from the image-processing means 35 are displayed on a display device 39, corresponding to the image displaying means 19 of FIG. 3.

Figure 5:
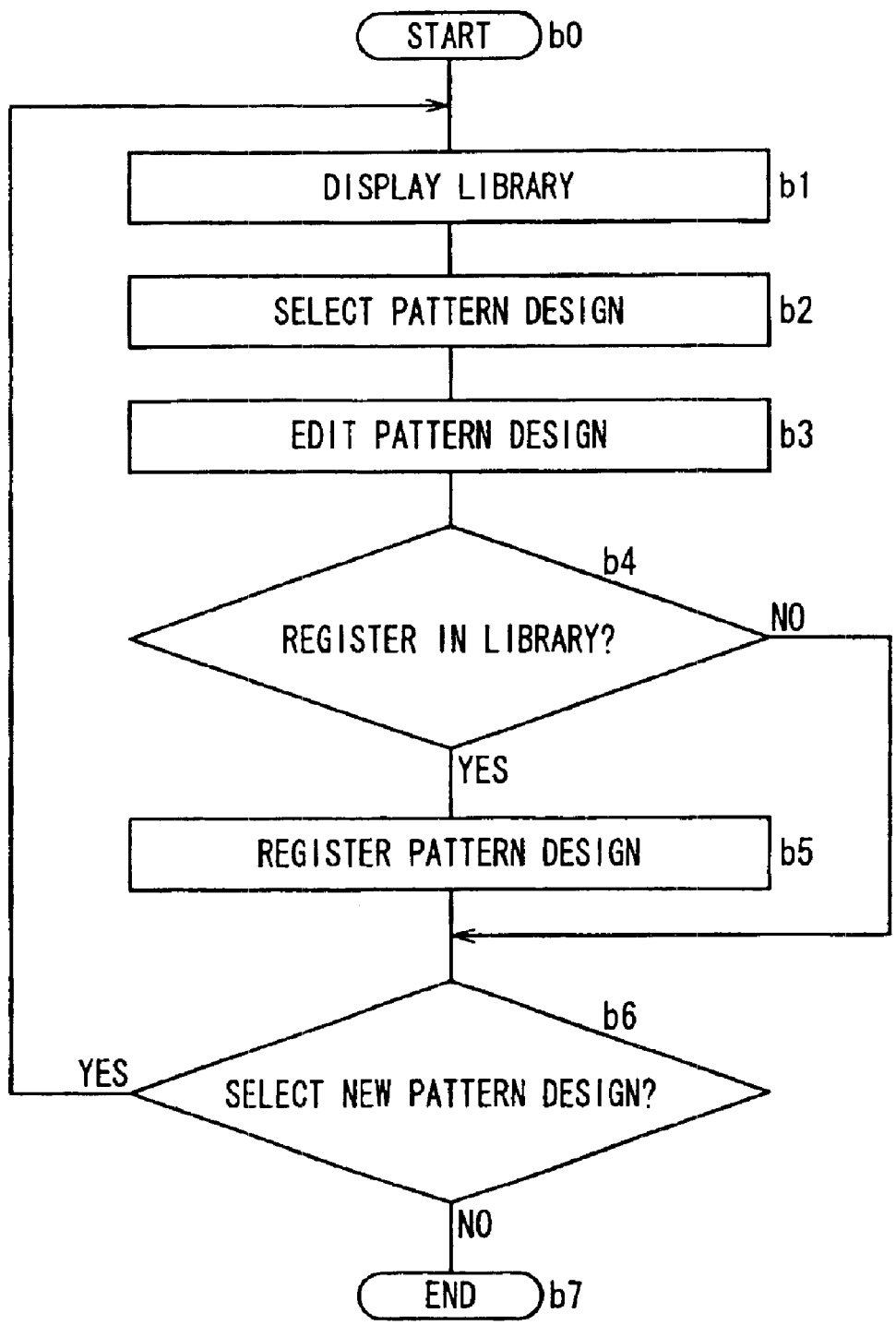
FIG. 5 is a flowchart showing a schematic procedure when designing a knitted fabric using the knit design apparatus 20 of FIG. 3.

FIG. 5 shows a schematic procedure when a designer designs a knitted fabricusing the knitted fabric editing means 26 of the knit design apparatus 20 of FIG. 3. The procedure starts from step b0, and in step b1, a part of the pattern design registered in the library registration means 21 in the form of module is displayed on a display screen of the image displaying means 19. The displayed pattern design can be selected by a click operation or the like by moving a cursor in the screen utilizing a pointing device. The display can be switched to display another pattern design. In step b2, the designer selects a pattern design. In step b3, the designer performs an editing operation to the selected pattern design. In editing, the size of the pattern design, the number of repetitions, the position or the like can be changed arbitrarily. For example, when the number of gathered stitches is changed, selection or substitution of knitting stitches for a pattern, and substitution of transformed knitting stitches in a part of or the entire periphery of the knitting stitch for a pattern are performed automatically, and images are displayed. As described above, the images of the knitting stitches are processed for rendering while being divided into a plurality of layers, so that the editing work such as movement, copying, deletion or the like can be performed easily.

When the editing of the pattern design is completed, in step b4, it is determined whether or not the edited pattern design is to be registered in the library registration means 21. When it is determined that it should be registered, the pattern design is registered in step b5. An instruction for registration can be performed, for example, by selecting a button or the like displayed in a part of the screen with a cursor and clicking thereon. The registration in the library means 21 also can be performed by forming a part of or the entire knitted fabric that is newly produced into a module. Furthermore, a new pattern design obtained by combining already registered pattern designs can be registered. After the end of the registration, or after it is determined that no registration should be performed in step b4, it is determined whether or not a new pattern design is selected from the library in step b6. When a new pattern design is to be selected, the procedure returns to step b1. When a new pattern design is not selected, the design of the knitted fabric ends in step b7.

FIGS. 6 and 7 show examples of element images of knitting stitches previously prepared in the means 22 for storing knitting stitch images of FIG. 3. FIG. 6 shows front stitches and FIG. 7 shows back stitches. (a) shows knitting stitch images that can be used in the case of gathering to the right, and (b) shows knitting stitch images that can be used the case of gathering to the left in each drawing. In FIG. 7(c), F indicates a front stitch, B indicates a back stitch and M indicates a miss-stitch, and element images in a state corresponding to transformation to which the portion of a transition of knitting stitches is subjected are shown. The knitting stitch shown as the basic knitting stitch 10 in FIG. 1 corresponds to the first element image shown in ① of FIG. 6(a). The knitting stitch for a pattern 11 in FIG. 1 corresponds to the third element image shown in ②. The transformed knitting stitches 12 and 13 correspond to the second and the fourth element images shown in ② and ④, respectively.

FIGS. 6 and 7 show the knitting stitches necessary to display a pattern of a basic knitted fabric such as jersey stitches, rib stitches, links, and one-pitch-gathering as element images. The element images as the minimum unit of the knitted fabric image are combined so that knitted fabrics of various patterns can be displayed, and the storage capacity of a memory or the like for storing the images can be saved. The case of gathering to the left in (b) has a relationship of reflected images with respect to the case of gathering to the right in (a), and therefore can be omitted and formed by inverting the right and the left in the mirror image process, when necessary.

FIG. 6(a) shows that 18 element images that are minimum necessary to display a knitted fabric that is gathered to the right for one pitch in jersey front stitches are prepared. This includes the fourteenth, the fifteenth, and the sixteenth knitting stitches for a pattern that are used to display the knitted fabric in which the position next to the one-pitch-gathering is a miss-stitch and the seventeenth transformed knitting stitch and the eighteenth knitting stitch for a pattern that are used to display gathering for shaping.

FIG. 6(b) shows that 18 element images that are minimum necessary to display a knitted fabric that is gathered to the left for one pitch in jersey front stitches are prepared.

FIG. 7(a) shows that thirteen element images that are minimum necessary to display a knitted fabric that is gathered to the right for one pitch in jersey back stitches are prepared. FIG. 7(b) shows that 13 element images that are minimum necessary to display a knitted fabric that is gathered to the left for one pitch in jersey back stitches are prepared. The reason why the number of the element images prepared in FIGS. 7(a) and 7(b) is smaller than that of FIGS. 6(a) and 6(b) is that the commonly usable element images are shared so as to save the storage capacity of the memory. However, duplicate element images can be prepared.

The element images of FIGS. 6(a) and 6(b) can be classified into the basic knitting stitch, the knitting stitch for a pattern and the transformed knitting stitch as follows. The number is the ordinal number of the element images shown.
Basic knitting stitch: 1
Knitting stitch for a pattern: 3, 6, 8, 14, 15, 16 and 18
Transformed knitting stitch: 2, 4, 5, 7, 9, 10, 11, 12, 13 and 17

FIGS. 8 to 24 show the images of the knitted fabric to be synthesized in the this embodiment in comparison with the data for making a knitted fabric. FIG. 8 shows the case where there is gathering in only one portion. FIG. 8(a) shows the same knitted fabric as that of FIG. 1. FIG. 8(b) shows an example of back stitches. FIG. 8(b) corresponds to the case of the front stitches of FIG. 7(a) in that the first element image of FIG. 7(a) is used as the knitting stitch corresponding to the basic knitting stitch 10 of FIG. 1 and the third, the second and the fourth element images are used as the knitting stitches corresponding to the knitting stitch for a pattern 11, the transformed knitting stitches 12 and 13, respectively. FIG. 9 shows a knitted fabric obtained by combining FIGS. 8(a) and 8(b).

Figure 10:
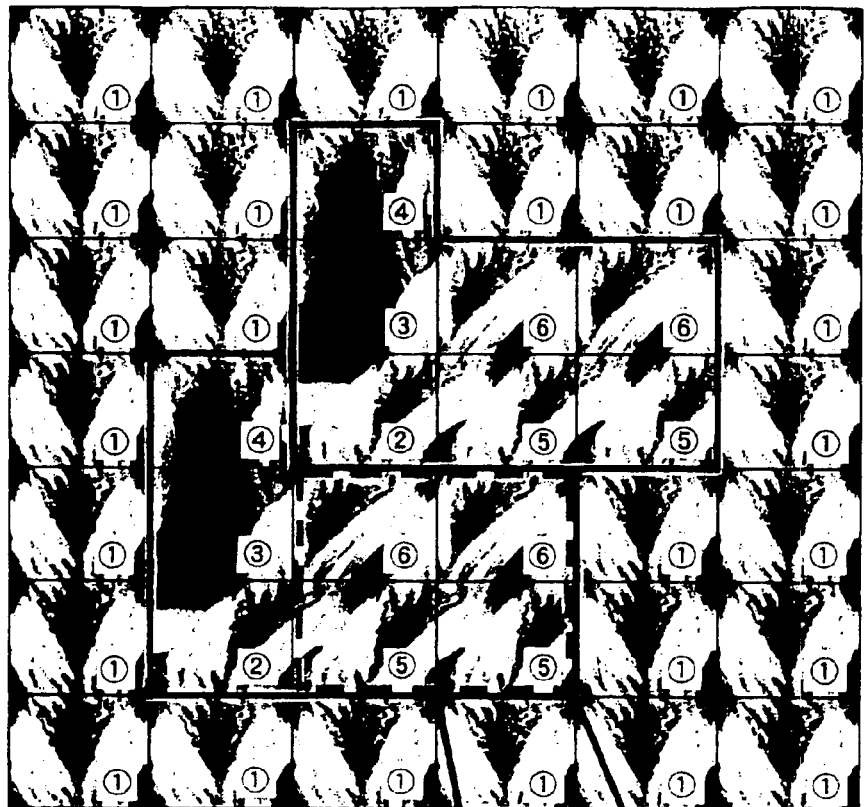
FIG. 10 is a view showing the images of a simulated knitted fabric that are displayed in comparison with data for making knitting stitches in this embodiment.
Figure 11:
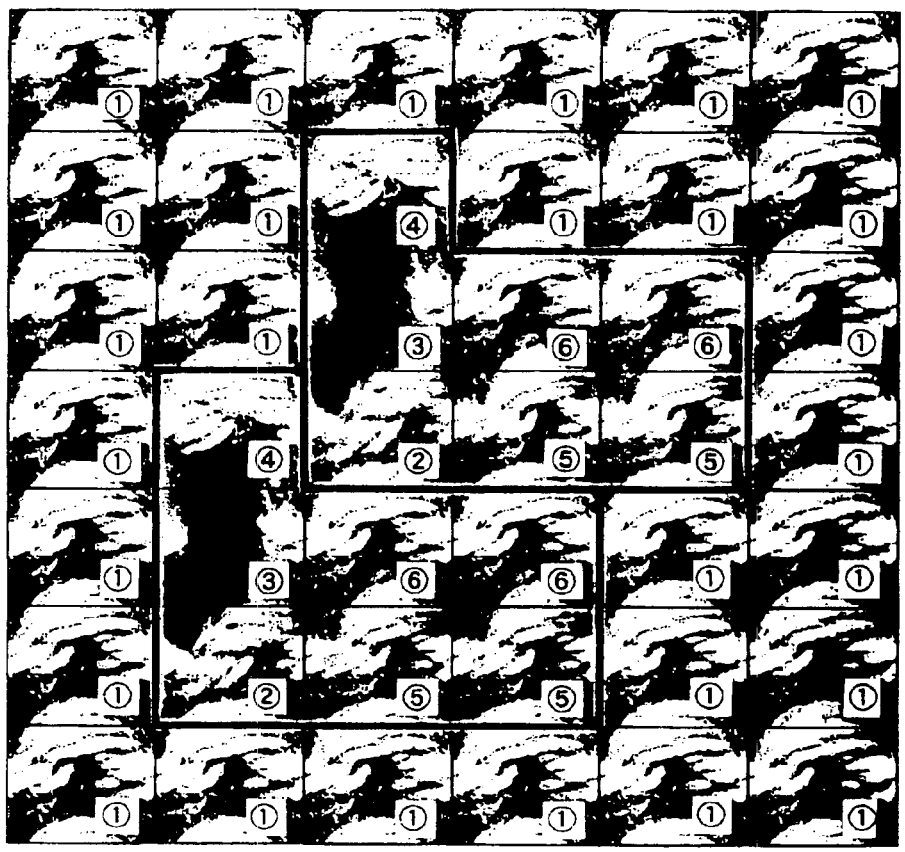
FIG. 11 is a view showing the images of a simulated knitted fabric that are displayed in comparison with data for making knitting stitches in this embodiment.

FIGS. 10 and 11 show the case in which gathering to the right is present consecutively in the upper right direction. Within one course, one-pitch-gathering to the right is present consecutively in three stitches. For the knitting stitch in the far left end of the three consecutive stitches, the second and the fourth element images are added as the transformed knitting stitches in the same manner as in FIGS. 8(a) and 8(b). For gathering to the right in the two stitches on the right side, the sixth element images of FIG. 6(a) and FIG. 7(a) are arranged as the knitting stitch for a pattern. On the lower side, that is, in the previous course of the two knitting stitches, the fifth element images of FIG. 6(a) and FIG. 7(a) are arranged as the transformed knitting stitches. The thus obtained area of the total of seven knitting stitches has an approximately L-shape, and by repeating this area as a unit in the upper right direction, an image of a consecutive texture pattern can be obtained.

FIGS. 12 to 14 show examples in which gathering is present consecutively in the upper direction. FIG. 12 shows the case in which gathering to the right is present consecutively in the upper direction. As the knitted fabric for a pattern corresponding to the gathering to the right on the lower side, the third element image of FIG. 6(a) is used, and the eighth element image is used as the knitted fabric for a pattern that is above that image. The seventh element image is used as a transformed knitting stitch between the eighth and the third elements. The fourth element image is used as the transformed knitting stitch above the eighth element image. FIG. 13 shows an example of a knitted fabric in which gathering to the left is present consecutively above the gathering to the right. Since the course preceding the knitting stitch of gathering to the right on the upper side is the next course of the knitting stitch of gathering to the right on the lower side, the ninth element image of FIG. 6(a) is used as an intermediate transformed knitting stitch. In FIG. 14, another gathered knitting stitch of FIG. 13 for each is added on the right side. For the knitting stitch for forming a pattern, the third and the sixth element images are used. For the knitting stitch for which the ninth element image is used in FIG. 13, the tenth element image is used as a transformed knitting stitch. For other transformed knitting stitches, the second and the fifth element images are used.

Figure 15:
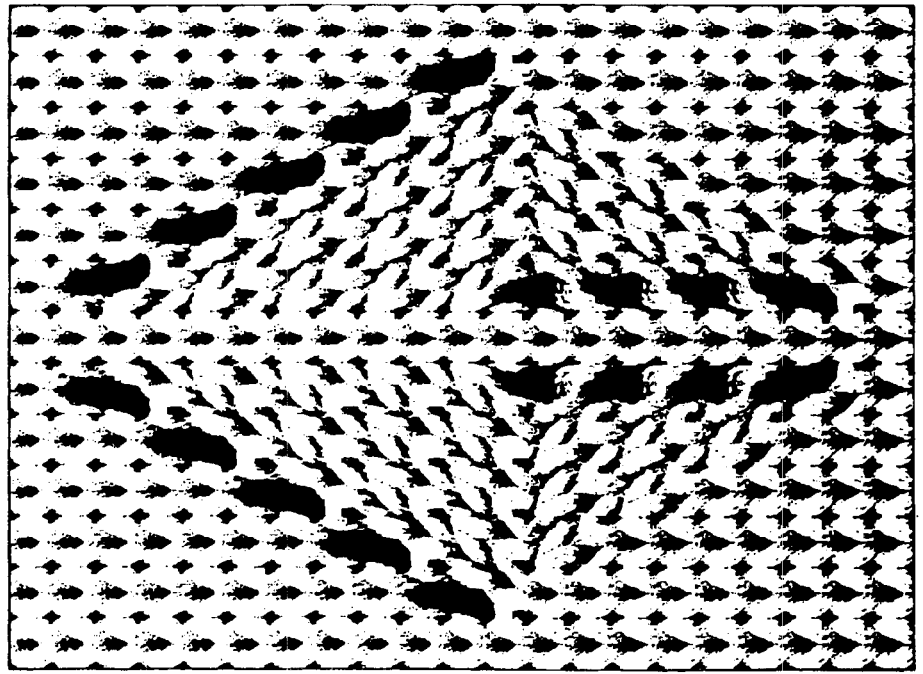
FIG. 15 is a view showing the images of a simulated knitted fabric that are displayed in comparison with data for making knitting stitches in this embodiment.
Figure 16:
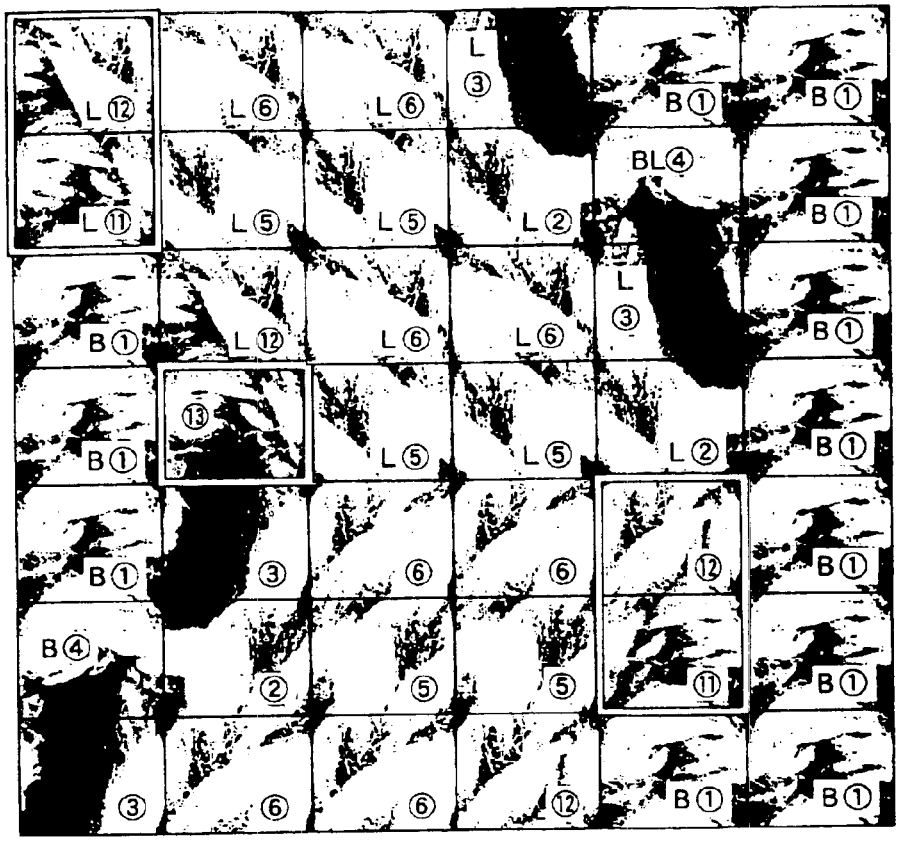
FIG. 16 is a view showing the images of a simulated knitted fabric that are displayed in comparison with data for making knitting stitches in this embodiment.
Figure 17:
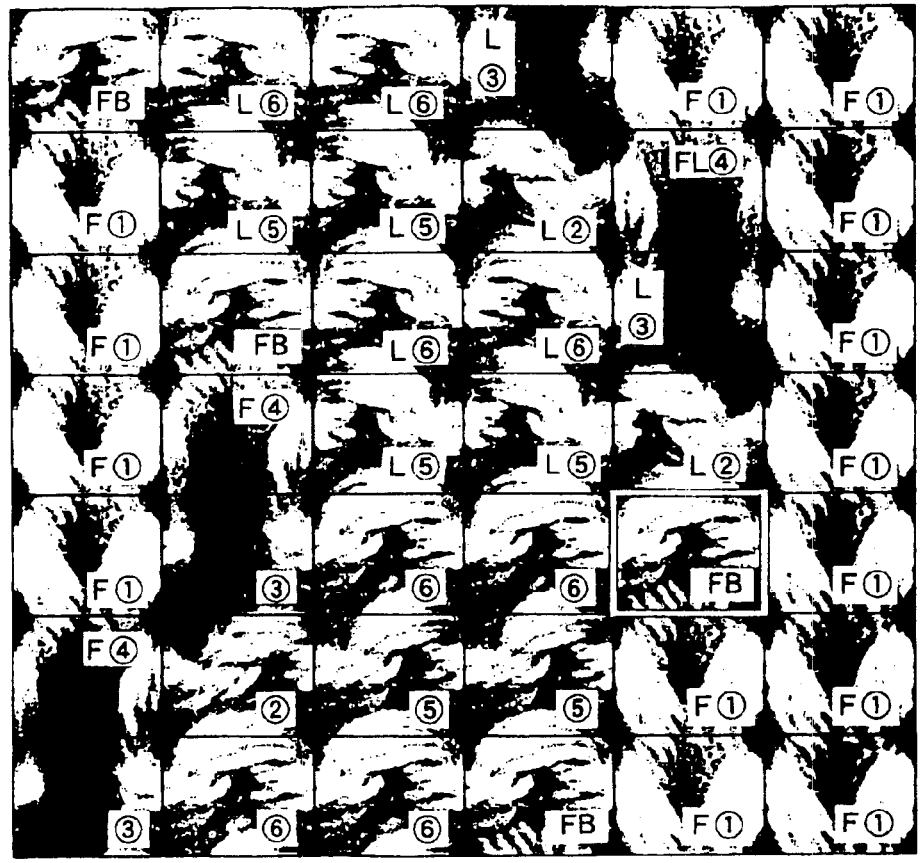
FIG. 17 is a view showing the images of a simulated knitted fabric that are displayed in comparison with data for making knitting stitches in this embodiment.

FIGS. 15 to 18 show examples of a texture pattern that can be formed by combining gathering. FIG. 15 shows a leaf pattern. One to five knitting stitches of one-pitch-gathering to the left and to the right are aligned in the course direction and displaced sequentially in a knitted fabric of the first element images of FIG. 6(a) corresponding to the basic knitting stitch of front knit that is front jersey stitches. Similarly to FIG. 10, a knitting stitch with no knitting yarn is present on the end of the side opposite to the gathering direction. FIGS. 16 and 17 show examples in which the end of gathering is opposite between the front and the back. In FIG. 16, one-pitch-gathering to the right with front knit is present consecutively in three stitches in the course direction, and back jersey stitches with back knit are arranged on both the sides thereof. Back jersey stitches are also arranged on both the sides of the knitting stitch with front knit that is gathered to the left for one pitch. In FIG. 17, the relationship between the front stitches and the back stitches is inverted with respect to FIG. 16. FIG. 18 shows a pattern to which the pattern of FIG. 16 is applied.

Figure 19:
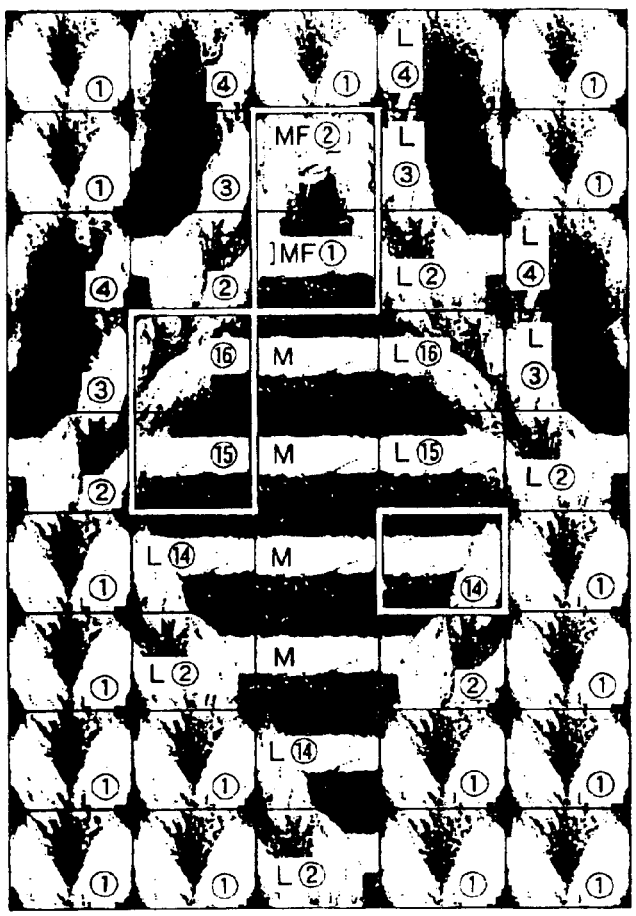
FIG. 19 is a view showing the images of a simulated knitted fabric that are displayed in comparison with data for making knitting stitches in this embodiment.
Figure 20:
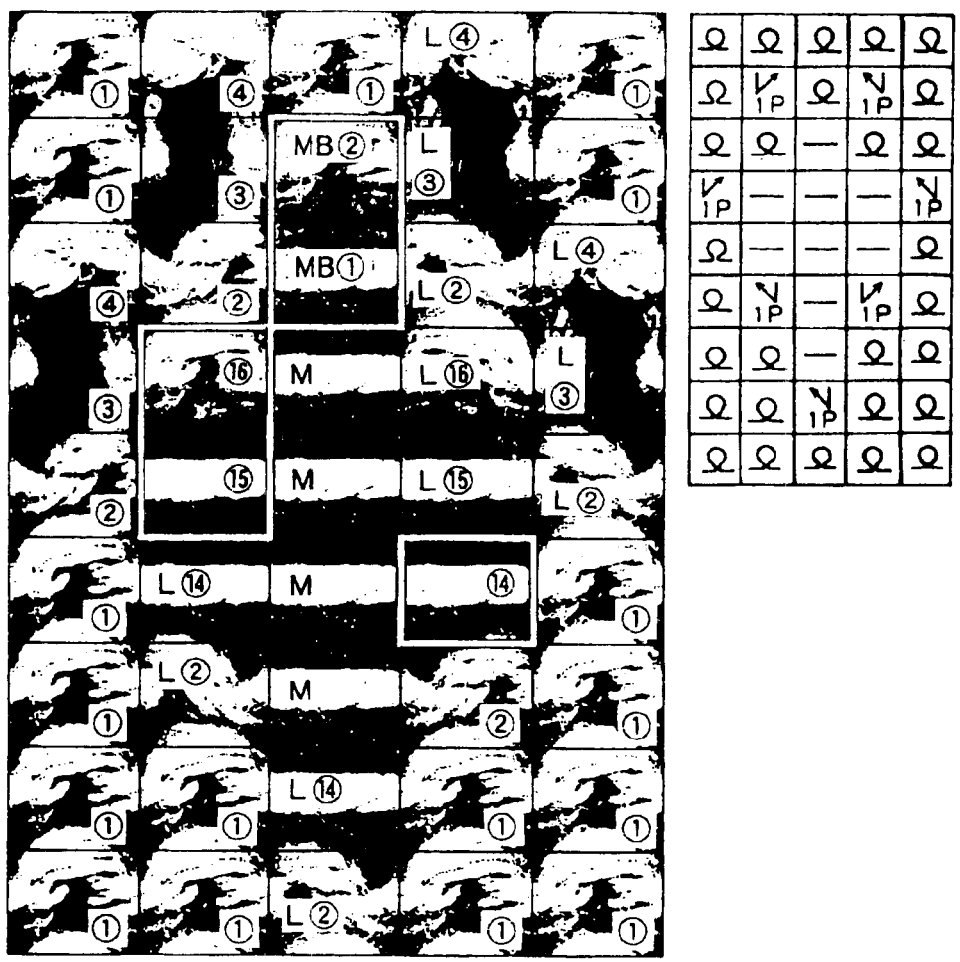
FIG. 20 is a view showing the images of a simulated knitted fabric that are displayed in comparison with data for making knitting stitches in this embodiment.
Figure 21:
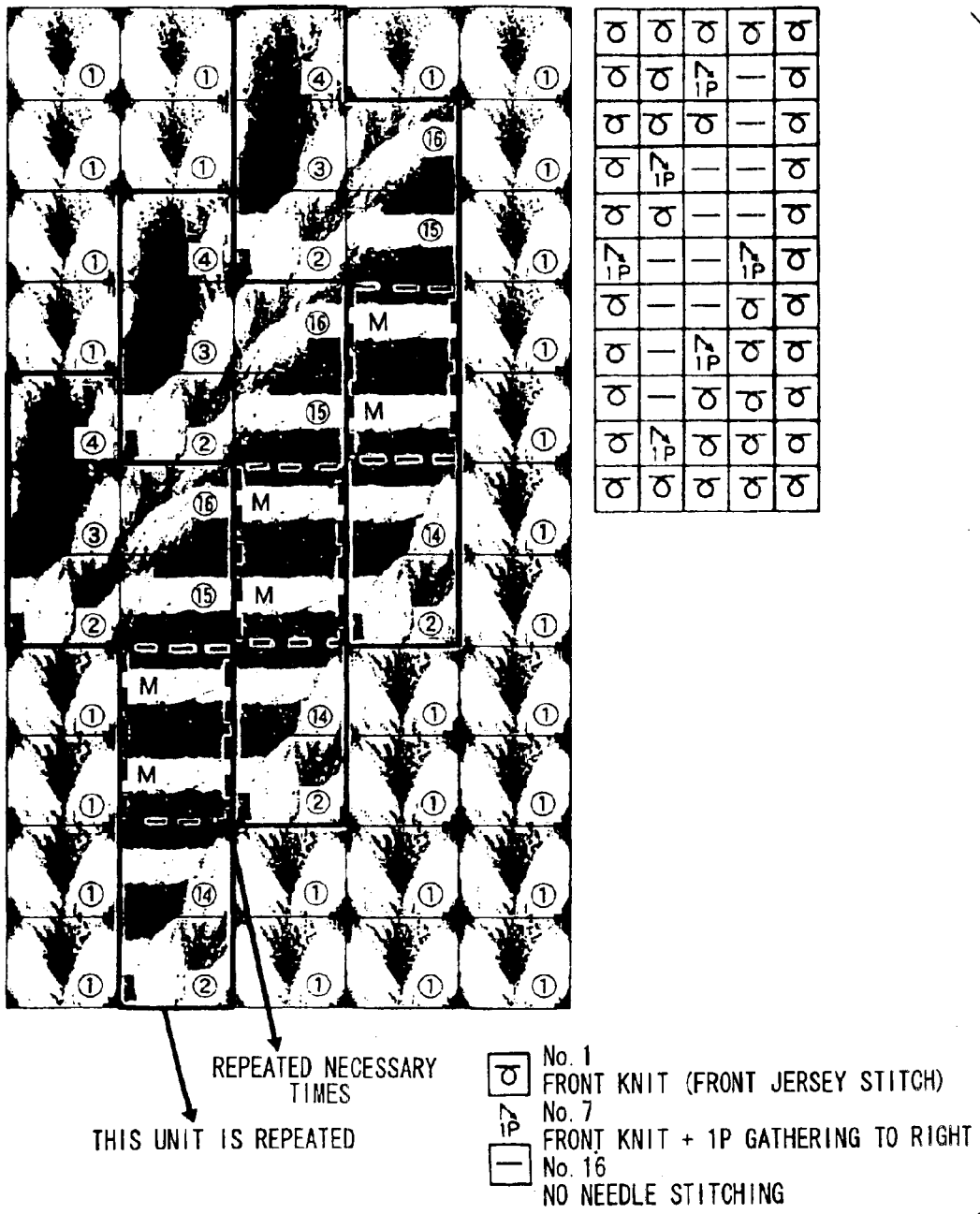
FIG. 21 is a view showing the images of a simulated knitted fabric that are displayed in comparison with data for making knitting stitches in this embodiment.

FIGS. 19 to 21 show examples of the case where a neighboring stitch of gathering is a miss-stitch. In FIGS. 19 and 20, the stitches on both ends in the course direction are gathered to the right or the left for one pitch, and the stitch therebetween is a miss-stitch without needle stitching. The gathering occurs in the direction that allows the stitches to become mutually closer on the upper side of the drawings, and in the direction that allows the stitches to become mutually apart on the lower side. FIG. 19 shows the case of front stitches, and FIG. 20 shows the case of back stitches. FIG. 21 shows the case where in the front knit, a knitting stitch that is gathered to the right for one pitch is arranged only in one end in a part of the miss-stitches aligning in the course direction.

Figure 22:
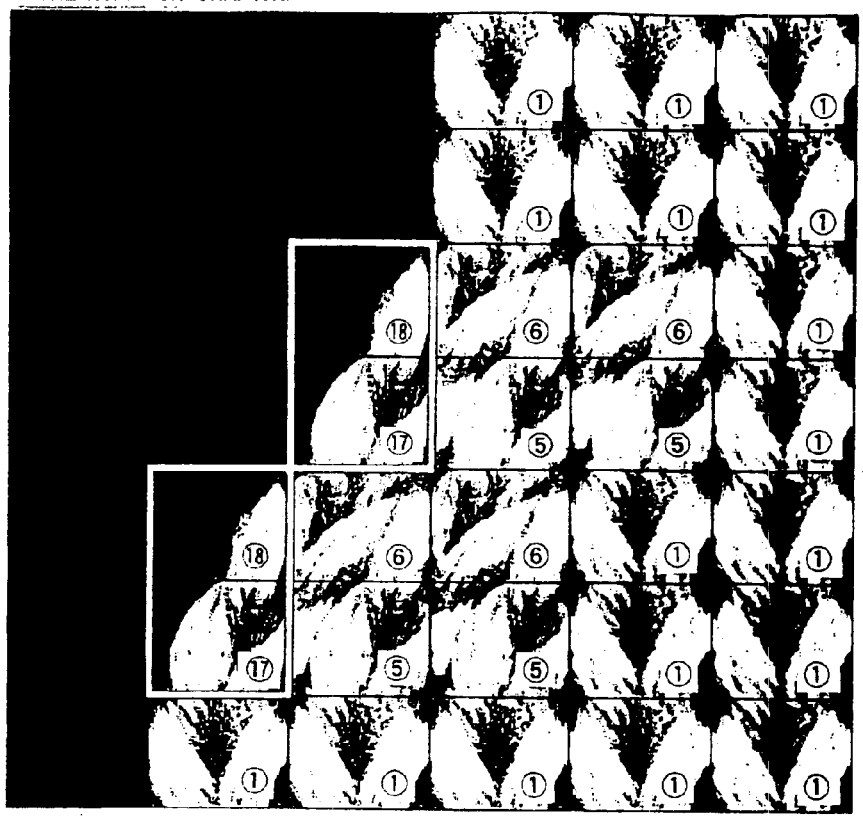
FIG. 22 is a view showing the images of a simulated knitted fabric that are displayed in comparison with data for making knitting stitches in this embodiment.
Figure 23:
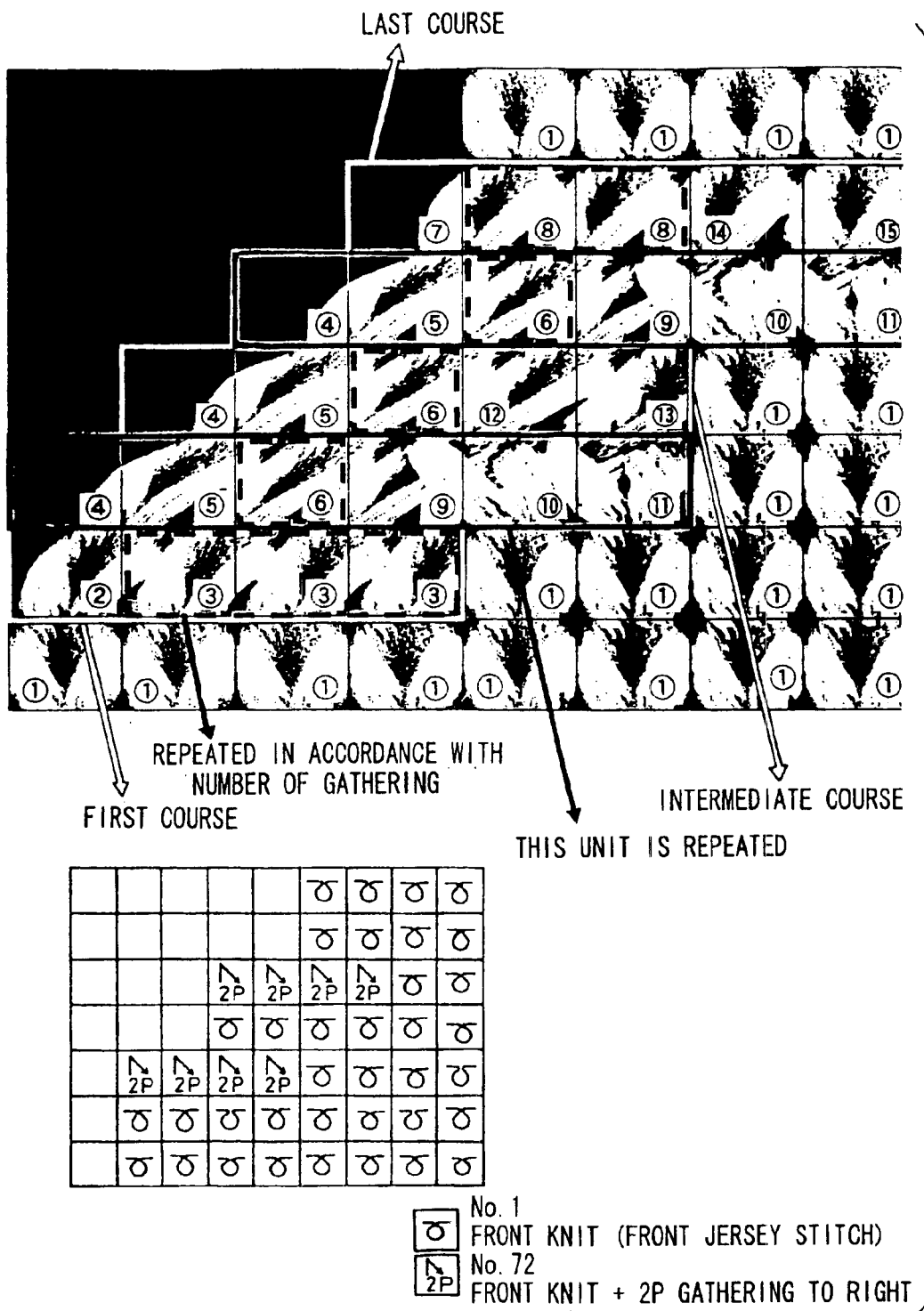
FIG. 23 is a view showing the images of a simulated knitted fabric that are displayed in comparison with data for making knitting stitches in this embodiment.

FIGS. 22 to 24 show gathering for shaping. FIGS. 22 shows an example of gathering for one pitch each. FIG. 23 shows the case of gathering for 2 pitches each. FIG. 24 shows an example in which a course of two-pitch gathering and a course with front knit are repeated. In FIG. 22, it is possible to be represented by combining element images shown in FIG. 6(a). When the knitted fabric images of FIGS. 23 and 24 are simulated, a knitting stitch image corresponding to the two-pitch gathering and an element image corresponding to a hemming stitch are required, and the knitted fabric image cannot be displayed properly with the element images of the basic knitting stitch, the knitting stitch for a pattern, and the transformed knitting stitch prepared in FIGS. 6 and 7.

FIG. 25 shows examples of an element image of a knitting stitch corresponding to the two-pitch gathering shown in FIGS. 23 and 24 and an element image of a knitting stitch corresponding to a hemming stitch. When these element images are combined, the simulation image of a knitted fabric that is projected laterally while performing a knitting-out process in the end portion of the knitted fabric can be generated as shown in FIG. 26. In order to increase the number of the laterally projected knitting stitches, it is sufficient to repeat a portion surrounded by a broken line in accordance with the number of stitches.

Figure 27:
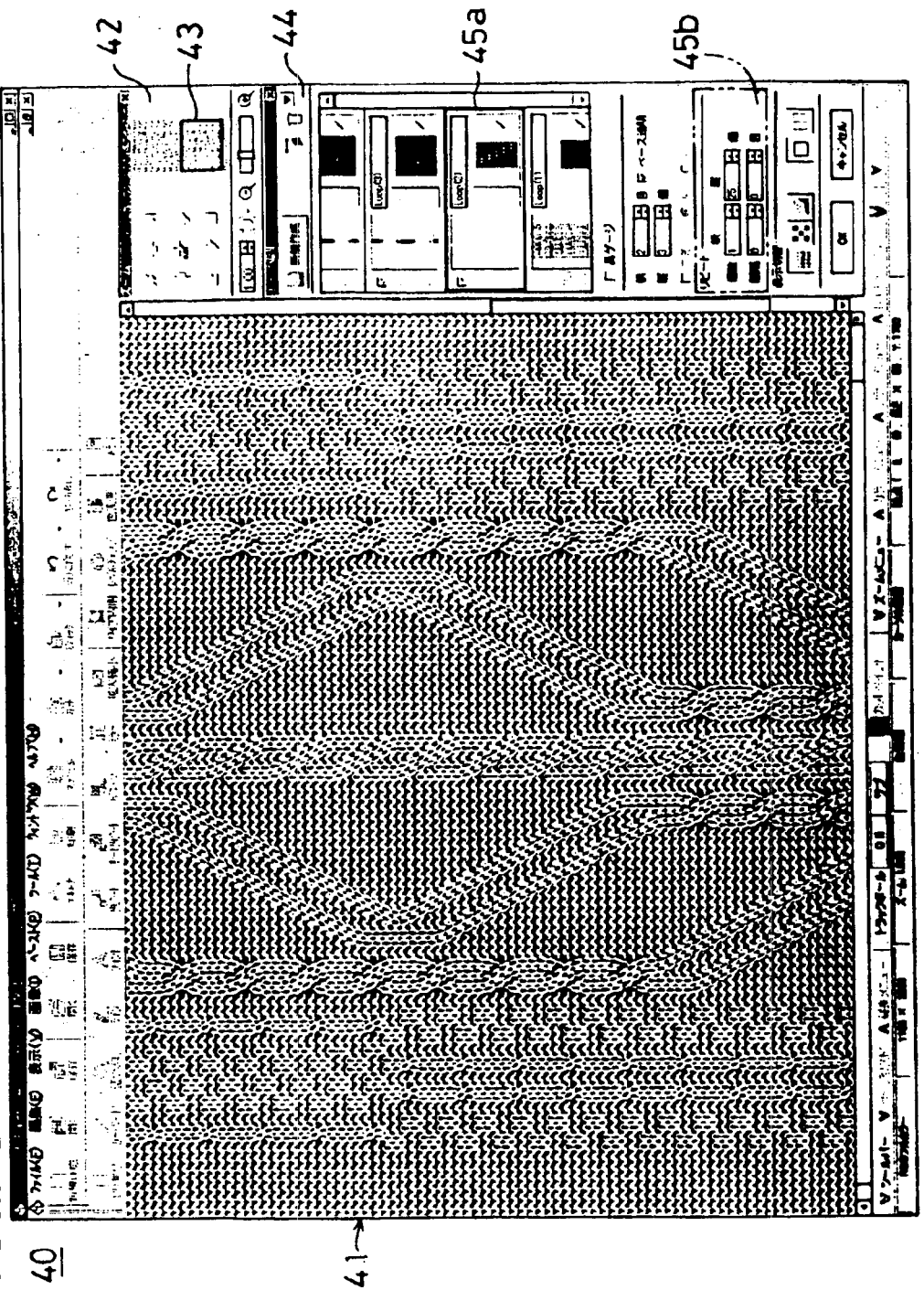
FIG. 27 is a view showing an example of a screen displayed in means 19 for displaying images at the time of editing work by means 26 for editing a knitted fabric of FIG. 3.
Figure 28:
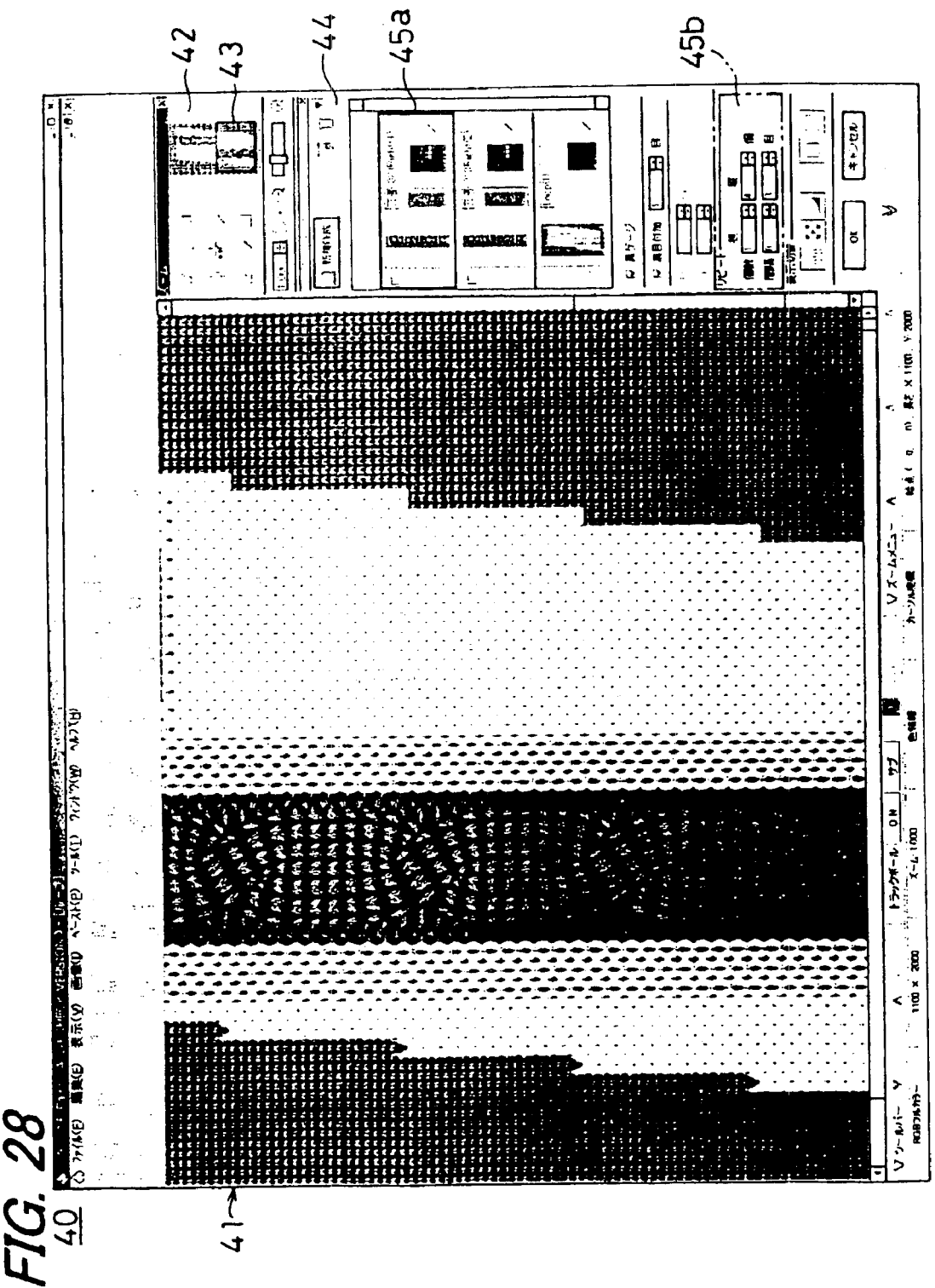
FIG. 28 is a view showing an example of a screen displayed in means 19 for displaying images at the time of editing work by means 26 for editing a knitted fabric of FIG. 3.

FIGS. 27 to 33 show examples of images displayed on a display screen 40 of the image displaying means 19 when performing editing work utilizing the means 26 for editing a knitted fabric of FIG. 3. FIGS. 27 and 28 show the screen when the knitting is being edited. A zoom image 41 of the knitted fabric is displayed corresponding to a range designation 43 that is performed in a zoom instruction region 42. A knitting stitch loop instructed by an instruction frame 45a in a loop editing region 44 can be added to the zoom knitted fabric 41 that is subjected to editing. Furthermore, a knitting stitch loop instructed by the instruction frame 45a can be repeated and added, utilizing an editing function 45b that instruct a repeat or the like.

Figure 29:
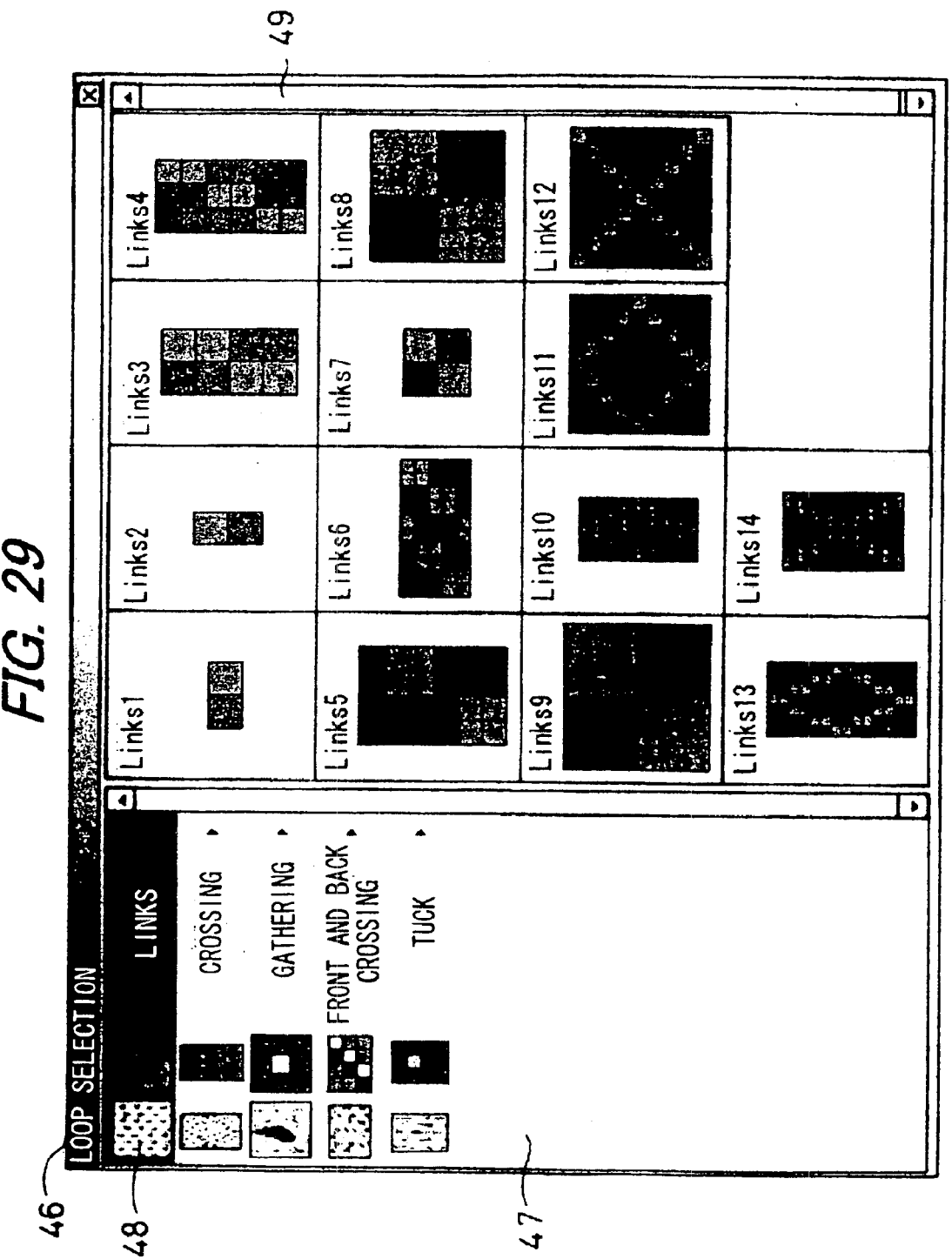
FIG. 29 is a view showing an example of a screen displayed in means 19 for displaying images at the time of selecting a pattern design at the editing work by the means 26 for editing a knitted fabric of FIG. 3.
Figure 30:
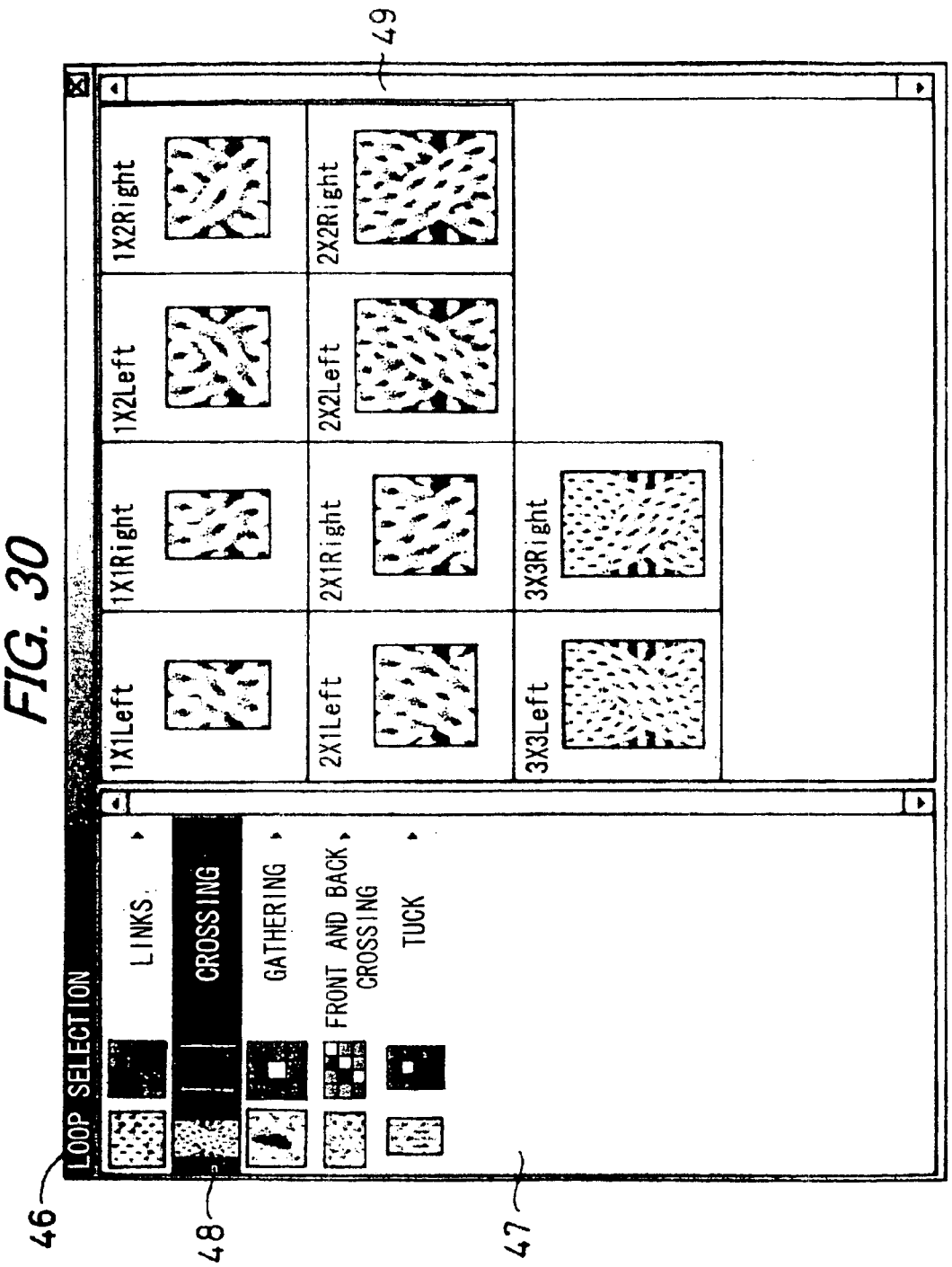
FIG. 30 is a view showing an example of a screen displayed in means 19 for displaying images at the time of selecting a pattern design at the editing work by the means 26 for editing a knitted fabric of FIG. 3.
Figure 31:
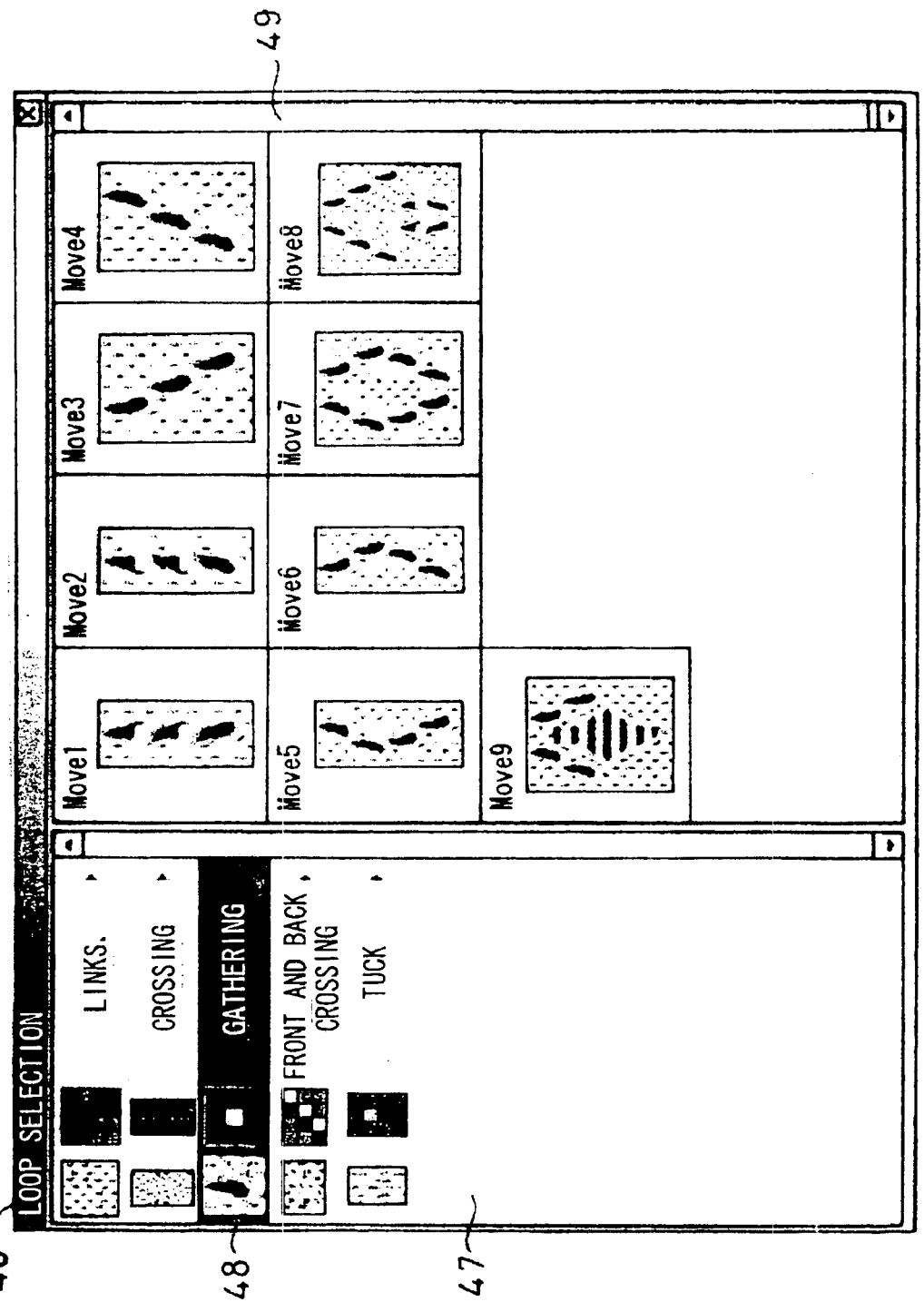
FIG. 31 is a view showing an example of a screen displayed in means 19 for displaying images at the time of selecting a pattern design at the editing work by the means 26 for editing a knitted fabric of FIG. 3.
Figure 32:
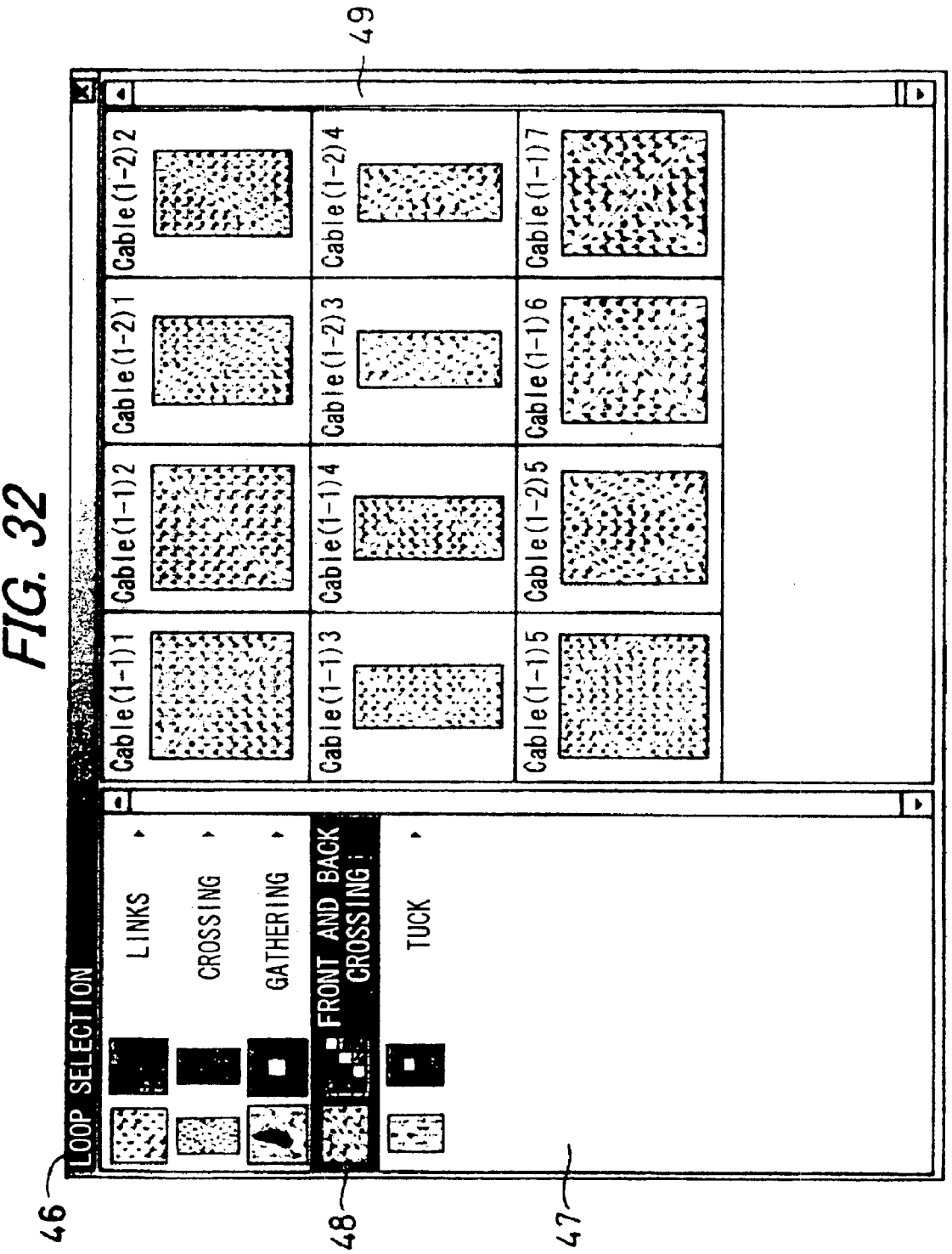
FIG. 32 is a view showing an example of a screen displayed in means 19 for displaying images at the time of selecting a pattern design at the editing work by the means 26 for editing a knitted fabric of FIG. 3.

FIGS. 29 to 33 show a loop selection screen 46 when selecting a pattern design previously registered in the library registration means 21 of FIG. 3 in the form of module. The pattern designs are classified basically into links, crossing, gathering, front and back crossing and tuck, and can be selected from a list display region 47 with a selection frame 48. The pattern design selected with the selection frame 48 is displayed in a module display region 49. FIG. 29 shows an example displaying a registered pattern design of links, FIG. 30 shows that of crossing, FIG. 31 shows that of gathering, FIG. 32 shows that of front and back crossing, and FIG. 33 shows that of tuck. The pattern design displayed in the module display region 49 can be displayed with color codes for knitting as shown in FIG. 29, or can be displayed as an image of a simulated knitted fabric as shown in FIGS. 30 to 33. These displays can be switched appropriately.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described above, according to the invention, when a knitted fabric is designed by combining basic knitting stitches and knitting stitches for a pattern while displaying the image of the knitted fabric, the image of the knitted fabric is formed by substituting transformed knitting stitches for knitting stitches knitted in the periphery of the knitting stitches for a pattern in the knitted fabric based on the predetermined corresponding relationship and combining the images of the basic knitting stitches, the knitting stitches for a pattern and the transformed knitting stitches. The basic knitting stitches are stitches for making a predetermined basic knitted fabric, the knitting stitches for a pattern are stitches for forming a texture pattern or the like by changing the knitting stitches of the knitted fabric from the shape of the basic knitting stitches. With the transformed knitting stitches, the influence to which the knitting stitches knitted in the periphery of the knitting stitches for a pattern are subjected due to the influence of making the knitting stitches for a pattern can be reflected. Since the transformed knitting stitches are arranged in the periphery of the knitting stitches for a pattern, a combination of knitting stitches close to those of an actually made knitted fabric can be obtained. The images of the basic knitting stitches, the knitting stitches for a pattern and the transformed knitting stitches can be generated in advance, so that the images of the knitted fabric whose knitting stitches are combined can be displayed rapidly as simulation images.

Furthermore, according to the invention, pattern designs including a basic knitted fabric in which the basic knitting stitches are arranged and a pattern knitted fabric in which the knitting stitches for a pattern are arranged as opposed to the basic knitting stitches and the transformed knitting stitches are substituted for the stitches in the periphery are previously registered in a library, and a pattern design registered in the library is selected and edited so as to design a knitted fabric. Therefore, the designer does not have to select directly the basic knitting stitches or the knitting stitches for a pattern for the design of the knitted fabric. Thus, design of knitted fabrics can be performed efficiently.

Furthermore, according to the invention, the images of a knitted fabric to be displayed as images of a knitted fabric are divided into and assigned to a plurality of layers, and when images are present at the position of the knitting stitches corresponding between the layers, the image of the knitting stitch of the layer having the highest priority is displayed, and an editing operation of changing the position and the shape of the image of the knitting stitch can be performed in each layer. Therefore, design of a knitted fabric in which knitting stitches are combined can be performed easily.

Furthermore, according to the invention, realistic images can be displayed by utilizing image data of an actually taken photograph of an actual knitted fabric for at least a portion of the images of the basic knitting stitches, the knitting stitches for a pattern or the transformed knitting stitches.

Furthermore, according to the invention, at least a portion of the basic knitting stitches, the knitting stitches for a pattern or the transformed knitting stitches is created utilizing computer graphics in advance, so that image data of knitting stitches constituting a knitted fabric that does not actually exist can be created and stored.

Furthermore, according to the invention, the knitted fabric displayed as images and information for making a knitted fabric can be mutually converted, based on the corresponding relationship between the basic knitting stitches and the knitting stitches for a pattern and the preset method for representing knitting stitches for making a knitted fabric, and therefore the appearance of the knitted fabric can be simulated from data for making a knitted fabric, and the images thereof can be displayed, or data for making a knitted fabric can be generated from the simulation images.

Furthermore, according to the invention, any one of the knit design methods described above is utilized by being implemented on a computer.

Furthermore, according to the invention, a knit design apparatus for designing a knitted fabric, with displaying images of a knitting fabric on the image displaying means, previously stores image data representing the basic knitting stitches, the knitting stitches for a pattern and the transformed knitting stitches in the knitting stitch image storing means, so that necessary images can be utilized rapidly. The images of a knitted fabric are displayed on the image displaying means while reflecting the influence to which the knitting stitches knitted in the periphery of the knitting stitches for a pattern are subjected in the knitted fabric by substituting transformed knitting stitches stored in the knitting stitch image storing means based on the predetermined corresponding relationship, in response to the information input to the knitted fabric information inputting means regarding a knitted fabric to be knitted, and combining the images of the basic knitting stitches, the knitting stitches for a pattern and the transformed knitting stitches. Therefore, a texture pattern, for example, can be simulated in a state close to that of an actual knitted fabric and displayed.

Furthermore, according to the invention, pattern designs including a basic knitted fabric in which the basic knitting stitches are arranged and a pattern knitted fabric in which the knitting stitches for a pattern are arranged as opposed to the basic knitting stitches, and the transformed knitting stitches are substituted for the stitches in the periphery thereof are previously registered in the library registration means in the form of module, and editing work including selecting a pattern design registered in the library and changing the size of the selected pattern design and/or the number of repetitions is performed by the knitted fabric editing means provided in the knitted fabric information inputting means. Thus, design of knitted fabrics can be performed easily.

Furthermore, according to the invention, the images of a knitted fabric can be synthesized by dividing knitting stitches into a plurality of layers, and displaying the image of the knitting stitch of the layer having the highest priority among the layers, and an editing operation of changing the position and the shape of the image of the knitting stitch can be performed in each layer. Therefore, the editing operation can be performed easily while displaying the image of the simulated knitted fabric.

Furthermore, according to the invention, the images of the simulated knitted fabric and information for making a knitted fabric can be mutually converted, based on the corresponding relationship between the basic knitting stitches and the knitting stitches for a pattern and the preset method for representing knitting stitches for making a knitted fabric, and therefore design and generation of information for making a knitted fabric can be performed easily.

What is claimed is:

1. A knit design method for designing a knitted fabric while displaying an image of the knitted fabric, comprising:

allowing designing a knitted fabric by combining an image representing a shape of a basic knitting stitch for making a predetermined basic knitted fabric and an image representing a shape of a knitting stitch for a pattern for forming a texture pattern by changing a knitting stitch of the knitted fabric from the shape of the basic knitting stitch;

allowing generating a plurality of kinds of images of transformed knitting stitches representing a shape of a knitting stitch in a periphery of the knitting stitch for a pattern that is transformed in accordance with a position by an influence of making the knitting stitch for a pattern, based on a combination of the basic knitting stitch and the transformed knitting stitch;

substituting an image selected from the plurality of images of transformed knitting stitches in accordance with a position of a knitting stitch for the knitting stitch in the periphery of the knitting stitch for a pattern, based on a predetermined corresponding relationship when design of the knitted fabric is performed by combining the basic knitting stitch and the knitting stitch for a pattern; and displaying the image of the knitted fabric as an image obtained by combining the basic knitting stitch, the knitting stitch for a pattern and the transformed knitting stitch.

2. The method of claim 1, wherein the design of the knitted fabric is performed by previously registering pattern designs in a library, the pattern designs being obtained by combining the basic knitting stitch, the knitting stitch for a pattern and the transformed knitting stitch so as to include a basic knitted fabric in which the basic knitting stitches are arranged and a pattern are arranged as opposed to the basic knitting stitches and the transformed knitting stitches are substituted for the stitches in the periphery, selecting a pattern design registered in the library, and editing the selected pattern design.

3. The method of claim 2, wherein the image of the knitted fabric is displayed by synthesizing images of the pattern design that are divided and assigned into a plurality of layers, a degree of priority is assigned to each layer, and when images are present at a position of knitting stitches corresponding between the layers, the image of the knitting stitch of the layer having the highest priority is displayed, and an operation of changing the position and the shape of the image of the knitting stitch can be performed for editing in each layer.

4. The method of claim 1, wherein at least a portion of the images of the basic knitting stitches, the knitting stitches for a pattern or the transformed knitting stitches is obtained by imaging an actual knitted fabric in advance and stored as image data.

5. The method of claim 1, wherein at least a portion of the basic knitting stitches, the knitting stitches for a pattern or the transformed knitting stitches is created utilizing computer graphics in advance, and stored as image data.

6. The method of claim 1, wherein the knitted fabric displayed as an image and information for making a knitted fabric can be mutually converted, based on a corresponding relationship between the basic knitting stitches and the knitting stitches for a pattern and a preset method for representing knitting stitches for making a knitted fabric.

7. A program for executing the knit design method of claim 1 on a computer.

8. A knit design apparatus for designing a knitted fabric while displaying an image of the knitted fabric on image displaying means, comprising:

knitting stitch image storing means for previously storing image data representing an image representing a shape of a basic knitting stitch for making a predetermined basic knitted fabric, an image representing a shape of a knitting stitch for a pattern for forming a texture pattern by changing a knitting stitch of the knitted fabric from the shape of the basic knitting stitch, and a plurality of images of transformed knitting stitches representing a shape of a knitting stitch in a periphery of the knitting stitch for a pattern that is transformed in accordance with a position by an influence of making the knitting stitch for a pattern;

knitted fabric information inputting means for inputting information for forming the image of the knitted fabric by combining the basic image and the pattern image stored in the knitting stitch storing means;

knitting stitch image transforming means for substituting an image selected from the plurality of images of transformed knitting stitches in accordance with a position of a knitting stitch stored in the knitting stitch image storing means for the image representing the knitting stitch made in the periphery of the pattern image in the knitted fabric based on a predetermined corresponding relationship, in response to the information input to the knitted fabric information inputting means; and knitted fabric image displaying means for displaying the image of the knitted fabric on the image displaying means by combining the images of the basic knitting stitches, the knitting stitches for a pattern and the transformed knitting stitches.

9. The apparatus of claim 8, further comprising:

library registration means for allowing previously registering pattern designs obtained by combining the basic knitting stitch, the knitting stitch for a pattern and the transformed knitting stitch so as to include the basic knitted fabric in which the basic knitting stitches are arranged and a pattern knitted fabric in which the knitting stitches for a pattern are arranged as opposed to the basic knitting stitches and the transformed knitting stitches are substituted for the stitches in the periphery, in a form of module, wherein the knitted fabric information inputting means includes knitted fabric editing means capable of performing editing work including selecting a pattern design registered in the library registration means and changing the size of the selected pattern design and/or the number of repetitions.

10. The apparatus of claim 9, wherein the knitted fabric image displaying means allows the image of the knitted fabric to be displayed by dividing images of knitting stitches into a plurality of layers and assigning a degree of priority to each layer, and displaying the image of the knitting stitch of the layer having the highest priority when images are present at a position of knitting stitches corresponding between the layers, and the knitted fabric editing means can perform an editing operation of generating and deleting an image of a knitting stitch and changing the position and the shape of the generated knitting stitch in each layer.

11. The apparatus of claim 8, further comprising:

synthesized knitted fabric converting means for converting the knitted fabric displayed by the image displaying means into information for making a knitted fabric, based on a corresponding relationship between the basic knitting stitches and the knitting stitches for a pattern and the preset method for representing knitting stitches for making a knitted fabric, wherein the knitted fabric information inputting means includes knitted fabric information converting means for converting the information for making a knitted fabric according to the method for representing knitting stitches to a combination of the basic knitting stitch and the knitting stitch for a pattern.

12. The method of claim 2, wherein at least a portion of the images of the basic knitting stitches, the knitting stitches for a pattern or the transformed knitting stitches is obtained by imaging an actual knitted fabric in advance and stored as image data.

13. The method of claim 3, wherein at least a portion of the images of the basic knitting stitches, the knitting stitches for a pattern or the transformed knitting stitches is obtained by imaging an actual knitted fabric in advance and stored as image data.

14. The method of claim 2, wherein at least a portion of the basic knitting stitches, the knitting stitches for a pattern or the transformed knitting stitches is created utilizing computer graphics in advance, and stored as image data.

15. The method of claim 3, wherein at least a portion of the basic knitting stitches, the knitting stitches for a pattern or the transformed knitting stitches is created utilizing computer graphics in advance, and stored as image data.

16. The method of claim 4, wherein at least a portion of the basic knitting stitches, the knitting stitches for a pattern or the transformed knitting stitches is created utilizing computer graphics in advance, and stored as image data.

17. The method of claim 12, wherein at least a portion of the basic knitting stitches, the knitting stitches for a pattern or the transformed knitting stitches is created utilizing computer graphics in advance, and stored as image data.

18. The method of claim 13, wherein at least a portion of the basic knitting stitches, the knitting stitches for a pattern or the transformed knitting stitches is created utilizing computer graphics in advance, and stored as image data.

19. The apparatus of claim 9, further comprising:

synthesized knitted fabric converting means for converting the knitted fabric displayed by the image displaying means into information for making a knitted fabric, based on a corresponding relationship between the basic knitting stitches and the knitting stitches for a pattern and the preset method for representing knitting stitches for making a knitted fabric, wherein the knitted fabric information inputting means includes knitted fabric information converting means for converting the information for making a knitted fabric according to the method for representing knitting stitches to a combination of the basic knitting stitch and the knitting stitch for a pattern.

20. The apparatus of claim 10, further comprising:

synthesized knitted fabric converting means for converting the knitted fabric displayed by the image displaying means into information for making a knitted fabric, based on a corresponding relationship between the basic knitting stitches and the knitting stitches for a pattern and the preset method for representing knitting stitches for making a knitted fabric, wherein the knitted fabric information inputting means includes knitted fabric information converting means for converting the information for making a knitted fabric according to the method for representing knitting stitches to a combination of the basic knitting stitch and the knitting stitch for a pattern.

\* \* \* \* \*